(12) United States Patent
Jang et al.

(10) Patent No.: US 8,548,066 B2
(45) Date of Patent: **\*Oct. 1, 2013**

(54) MULTI-DIRECTIONAL COMB FILTERING IN A DIGITAL VIDEO DECODER

(71) Applicant: Huaya Microelectronics, Inc., San Jose, CA (US)

(72) Inventors: Sheng De Jang, Cupertino, CA (US); Hsiu Min Wong, Shanghai (CN); Zu Jun Liang, Shanghai (CN); Qing Yang, Shanghai (CN)

(73) Assignee: WZ Technology Inc., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,931

(22) Filed: Jan. 25, 2013

(65) Prior Publication Data

US 2013/0155328 A1    Jun. 20, 2013

Related U.S. Application Data

(63) Continuation of application No. 12/352,607, filed on Jan. 12, 2009, now Pat. No. 8,363,734.

(60) Provisional application No. 61/020,718, filed on Jan. 12, 2008.

(51) Int. Cl.
    *H04N 7/12* (2006.01)

(52) U.S. Cl.
    USPC ............ 375/240.29; 375/240.01; 375/240.26; 348/663; 348/665

(58) Field of Classification Search
    USPC ............. 375/240.1, 240.26, 240.29; 348/663
    See application file for complete search history.

(56) References Cited

U.S. PATENT DOCUMENTS

| | | | | |
|---|---|---|---|---|
| 5,895,987 A * | 4/1999 | Lo et al. | ........................ | 307/125 |
| 6,239,842 B1 * | 5/2001 | Segman | ........................ | 348/448 |
| 7,460,180 B2 * | 12/2008 | Chao | ............................ | 348/624 |
| 2005/0195899 A1 * | 9/2005 | Han | ........................ | 375/240.21 |
| 2006/0197876 A1 * | 9/2006 | Park et al. | ..................... | 348/663 |
| 2007/0217509 A1 * | 9/2007 | Chan et al. | ................. | 375/240.12 |
| 2008/0018799 A1 * | 1/2008 | Wu et al. | ....................... | 348/663 |
| 2008/0089408 A1 * | 4/2008 | Choi et al. | ............... | 375/240.01 |
| 2008/0107171 A1 * | 5/2008 | Bretl et al. | ............... | 375/240.01 |
| 2009/0161770 A1 * | 6/2009 | Dong et al. | ............... | 375/240.29 |

OTHER PUBLICATIONS

Dr. M. Silverberg, The Concept of Motion Adaptive Colorplus Encoding, Oct. 14, 1994, IEEE Colloquium, pp. 3/1-3/5.*

Hamid R. Rabiee, H. Radha, and R. L. Kashyap, Error Concealment of Still Image and Video Streams with Multi-Directional Recursive Nonlinear Filters, Sep. 1996, Image Processing, 1996. Proceedings., International Conference, vol. 2, pp. 37-40.*

* cited by examiner

*Primary Examiner* — Edan Orgad
*Assistant Examiner* — Fahimeh Mohammadi
(74) *Attorney, Agent, or Firm* — Sillicon Valley Patent Group LLP

(57) ABSTRACT

A multi-directional comb filtering in a digital video decoder is provided. Some embodiments of the present invention provide for a method of filtering, using a multi-directional comb filter, pixel data from a sequence of fields of pixel data, wherein the fields of pixel data comprise a previous field, a current field and a next field, and wherein each of said fields includes a previous line, a current line, a next line.

10 Claims, 25 Drawing Sheets

MULTI-DIRECTIONAL COMB FILTERING IN A DIGITAL VIDEO DECODER

CROSS-REFERENCE TO RELATED APPLICATIONS

This application is a continuation of U.S. patent application Ser. No. 12/352,607 filed Jan. 12, 2009, now U.S. Pat. No. 8,363,734 issued Jan. 29, 2013, titled "Multi-directional comb filtering in a digital video decoder", which, in turn, claims the benefit under 35 U.S.C. 119(e) of U.S. Provisional Patent Application No. 61/020,718, filed Jan. 12, 2008, both of which are incorporated herein by reference.

BACKGROUND OF THE INVENTION

1. Field of the Invention

The invention relates to digital video decoders and in particular to multi-directional comb filtering in a digital video decoder.

2. Background of the Invention

Due to advancing semiconductor processing technology, integrated circuits (ICs) have greatly increased in functionality and complexity. With increasing processing and memory capabilities, many formerly analog tasks are being performed digitally. For example, images, audio and full motion video can now be produced, distributed, and used in digital formats.

Although digital images generally provide higher noise immunity, most digital images in digital video streams are converted from analog video streams. The original analog video stream may contain noise from various sources. For example, modulation, wireless transmission and demodulation of TV signals may introduce Gaussian-like noise. Furthermore, even analog video transferred over transmission lines may have Gaussian-like noise due to magnetic fields around the transmission lines. In addition, the digitalizing process may inadvertently amplify minor noise problems in the analog video stream. For more information on methods of noise reduction for interlaced digital video stream, see U.S. Patent Publication 20070103594 (application Ser. No. 11/644,855 by Zhu, published on May 10, 2007, filed on Dec. 22, 2006, titled "Recursive noise reduction with still pixel detection" and assigned to Huaya Microelectronics, Ltd.), the contents of which are incorporated herein by reference.

FIG. 1A is an illustrative diagram of a portion of interlaced digital video signal 100' most often used in television systems. Interlaced digital video signal 100' comprises a series of individual fields F(0) to F(N). Even fields contain even numbered rows while odd fields contain odd numbered rows. For example if a frame has 400 rows of 640 pixels, the even field would contains rows 2, 4, . . . 400 and the odd field would contains rows 1, 3, 5, . . . 399 of the frame. In general, for an interlaced video signal each field is formed at a different time. For example, an interlaced video capture device (e.g. a video camera) captures and stores the odd scan lines of a scene at time T as field F(5), then the video capture device stores the even scan lines of a scene at time T+1 as field F(6). The process continues for each field. Two main interlaced video standards are used. The PAL (Phase Alternating Line) standard, which is used in Europe, displays 50 fields per seconds (fps) and the NTSC (National Television System Committee) standard, which is used in the United States, displays 60 fps. Interlaced video systems were designed when bandwidth limitations precluded progressive (i.e., non-interlaced) video systems with adequate frame rates. Specifically, interlacing two 25 fps fields achieved an effective 50 frame per second frame rate because the phosphors used in television sets would remain "lit" while the second field is drawn.

To ease transmission of video signals, chrominance information and luminance information are combined via modulation into a single composite video signal. Imperfect decoding of composite video signals in either PAL or NTSC format may lead to color-crossing. Specifically, color-crossing error often appears in a video image where the local luminance spatial frequency is near the sub-carrier frequency of the chrominance information. Color-crossing errors occur in both PAL and NTSC video signals.

For example, NTSC video signals typically have a chrominance sub-carrier frequency of 3.58 MHz, i.e., chrominance information is modulated by a sinusoid signal with a frequency equal to 3.58 MHz before transmission. Luminance information may also have components that overlap with the chrominance information near the chrominance sub-carrier frequency. Thus, the luminance components near the chrominance sub-carrier frequency cause color-crossing errors, which cannot be cleanly removed. Generally, during video decoding a band pass filter at the chrominance sub-carrier frequency is used to obtain the chrominance information. However, the luminance components, which are near the chrominance sub-carrier frequency, are not blocked by the band pass filter. Therefore, the decoded chrominance signal would include "unclean" chrominance information. The color-crossing errors produce rainbow like color blinking in the decoded video image. In PAL video signals, the same color-crossing errors also occur at the PAL chrominance sub-carrier frequency of 4.43 MHz. Color-crossing error can also occur in other encoded video signals.

Conventionally, 3D comb filters have been used to reduce color-crossing errors. Specifically, in NTSC composite video signals the chrominance of corresponding pixels in two consecutive fields of the same type (odd or even) have a phase difference equal to 180 degrees. A 3D comb filter can cancel the miss-included luminance components by a simple subtraction of the video signal values of the two corresponding pixels, when the video image is not changing. However, for PAL composite video, the chrominance of corresponding pixels in two consecutive fields of the same type have only a 90-degree phase difference. Thus, to use 3D comb filters to correct color-crossing errors in decoded PAL composite video signals, four fields must be used.

While 3D comb filters can reduce color-crossing errors, 3D comb filters may also degrade other aspects of video quality. For example, 3D comb filters are very sensitive to noise in composite video signals; therefore, a digital video decoder with a 3D comb filter would have difficulties with weak video signals, which are common in many areas. Furthermore, high quality 3D comb filters are very expensive relative to other components of a video system. For more information on efficient reduction of color-crossing errors from decoded composite video signals, see U.S. Patent Publication 2006/0092332 (application Ser. No. 11/046,591 by Zhu, published on May 4, 2006, filed on Jan. 28, 2005, titled "Color-crossing error suppression system and method for decoded composite video signals" and assigned to Huaya Microelectronics, Ltd.), the contents of which are incorporated herein by reference.

Modern video signals typically consist of a sequence of still images, or frames or fields as described above. By displaying the sequence of images in rapid succession on a display unit such as a computer monitor or television, an illusion of full motion video can be produced. A standard NTSC television display has a frame rate of 29.970 fps (frames per second). For historical reasons, the frames in video displays for most consumer applications (and many professional applications) are formed from "interlaced" video signals in which the video signals are made up of "fields" that include half the data required for a full frame. As described above, each field includes every other row of pixels that would be included in a complete frame, with one field (the "odd field") including all the odd rows of the frame, and the other field (the "even field") including all of the even rows.

FIG. 1B depicts this interlacing concept, as a view 110' is interlaced into an odd field 120' and an even field 130'. Odd field 120' includes odd rows SO(1), SO(2), SO(3), SO(4), SO(5), SO(6), SO(7), and SO(8), which represent rows 1, 3, 5, 7, 9, 11, 13, and 15, respectively, of view 110'. Even field 130' includes even rows SE(1), SE(2), SE(3), SE(4), SE(5), SE(6), SE(7), and SE(8), which represent rows 2, 4, 6, 8, 10, 12, 14, and 16, respectively, of view 110'. Note that each of odd rows SO(1) SO(8) in field 120' corresponds to a blank row (i.e., a row with no pixel values) in field 130', while each of even rows SE(1) SE(8) in field 130' corresponds to a blank row in field 120'.

View 110' depicts a white square 111' formed in a shaded background 112'. Therefore, odd rows SO(1) SO(8) are all shaded, except for a white portion 121' in each of odd rows SO(4), SO(5), and SO(6) corresponding to the portion of those rows corresponding to white square 111'. Similarly, even rows SE(1) SE(8) are all shaded, except for a white portion 131' in each of even rows SE(3), SE(4), and SE(5), corresponding to the portion of those rows corresponding to white square 111'.

Note that color video signals contain chrominance and luminance information. Chrominance is that portion of video that corresponds to color values and includes information about hue and saturation. Color video signals may be expressed in terms of RGB components: a red component R, a green component G, and a blue component B. Luminance is that portion of video corresponding to brightness value. In a black and white video signal, luminance is the grayscale brightness value of the black and white signal. In a color video signal, luminance can be converted into red, green and blue components, or can be approximated by a weighted average of the red, green and blue components. For example, in one well-known scheme, luminance is approximated by the equation: $Y=0.30*R+0.59*G+0.11*B$. For explanatory purposes, shaded regions of the figures represent lower luminance values than blank (white) regions. For example, the white portion 121' in odd row SO(4) has a higher luminance value than the shaded portion of the same row.

To generate a progressive (i.e., non-interlaced) video display from an interlaced video signal, the video signal must be de-interlaced. Conventional de-interlace methodologies can be divided into two main categories: (1) 2D de-interlacing; and (2) 3D de-interlacing. In 2D de-interlacing, a frame is recreated from a single field via interpolation of the rows in that field. A common 2D de-interlacing technique involves duplicating each row of a single frame to provide pixel values for the blank rows; i.e., each blank row in an odd field could be filled with a copy of the odd row directly below that empty row, while each blank row in an even field could be filled with a copy of the even row directly above that empty row. The 2D de-interlacing is particularly useful for scenes involving fast motion since even if a scene change occurs between consecutive fields, such changes would not distort a frame formed using "pure" common-field pixel interpolation (i.e., formed using only the pixels in a single field). For additional information on 2D and 3D mixing, see U.S. Pat. No. 7,142,223 (application Ser. No. 10/659,772 by Zhu, issued on Nov. 28, 2006, titled "Mixed 2D and 3D de-interlacer" and assigned to Huaya Microelectronics, Ltd.), the contents of which are incorporated herein by reference.

Hence, there is a need for improved digital video decoders to minimize distortion in a recreated image.

BRIEF SUMMARY OF THE INVENTION

Some embodiments of the present invention provide for a method of filtering, using a multi-directional comb filter, pixel data from a sequence of fields of pixel data, wherein the fields of pixel data comprise a previous field, a current field and a next field, and wherein each of said fields includes a previous line, a current line, a next line, the method comprising: determining a temporal chrominance velocity (K__3dcomb) relative to a pixel position of the current field, wherein the temporal chrominance velocity (K__3dcomb) is determined as one or more of: (1) C__3dcomb_p/(C__3dcomp_p+C__3dcomb_n) wherein C__3dcomb_p=(cvbs_c−cvbs_p), wherein cvbs_c comprises a second video signal value for the pixel position on the previous field and wherein cvbs_p comprises a first video signal value for the pixel position on the current field; and (2) C__3dcomb_n/(C__3dcomp_p+C__3dcomb_n) wherein C__3dcomb_n=(cvbs_c−cvbs_n), wherein cvbs_n comprise a third video signal value for the pixel position on the next field; and determining a temporal luminance based on: (1) the first video signal value; (2) the second video signal value; (3) the third video signal value; and (4) the temporal chrominance velocity.

In other embodiments of the present invention provide for a multi-directional comb filter for filtering pixel data from a sequence of fields of pixel data, wherein the fields of pixel data comprise a previous field, a current field and a next field, and wherein each of said fields includes a previous line, a current line, a next line, the multi-directional comb filter comprising: means for determining a temporal chrominance velocity (K__3dcomb) relative to a pixel position of the current field, wherein the temporal chrominance velocity (K__3dcomb) is determined as one or more of: (1) C__3dcomb_p/(C__3dcomp_p+C__3dcomb_n) wherein C__3dcomb_p=(cvbs_c−cvbs_p), wherein cvbs_c comprises a second video signal value for the pixel position on the previous field and wherein cvbs_p comprises a first video signal value for the pixel position on the current field; and (2) C__3dcomb_n/(C__3dcomp_p+C__3dcomb_n) wherein C__3dcomb_n=(cvbs_c−cvbs_n), wherein cvbs_n comprise a third video signal value for the pixel position on the next field; and means for determining a temporal luminance based on: (1) the first video signal value; (2) the second video signal value; (3) the third video signal value; and (4) the temporal chrominance velocity.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description which follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

This application relates to the following applications each of which are incorporated by reference herein in their entirety:

U.S. patent application Ser. No. 12/352,585, filed Jan. 12, 2009, now U.S. Pat. No. 8,174,621 issued May 8, 2012 and entitled "Digital video decoder architecture";

U.S. patent application Ser. No. 12/352,542, filed Jan. 12, 2009, now U.S. Pat. No. 8,237,863 issued Aug. 7, 2012 and entitled "Adaptive gain and offset control in a digital video decoder";

U.S. patent application Ser. No. 12/352,593, filed Jan. 12, 2009, now U.S. Pat. No. 8,238,443 issued Aug. 7, 2012 and entitled "Digital timing extraction and recovery in a digital video decoder"; and U.S. patent application Ser. No. 12/352,607, filed Jan. 12, 2009, now U.S. Pat. No. 8,363,734 issued Jan. 29, 2013 and entitled "Multi-directional comb filtering in a digital video decoder".

Figure 1A:
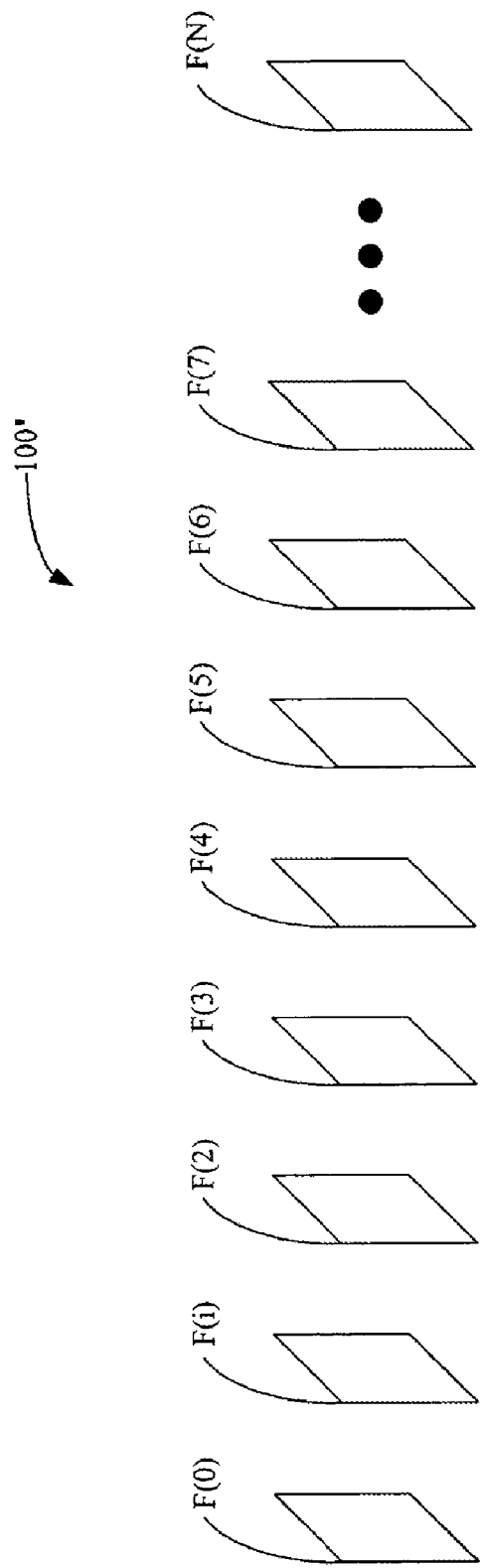
FIG. 1A is an illustration of an interlaced video signal.
Figure 1B:
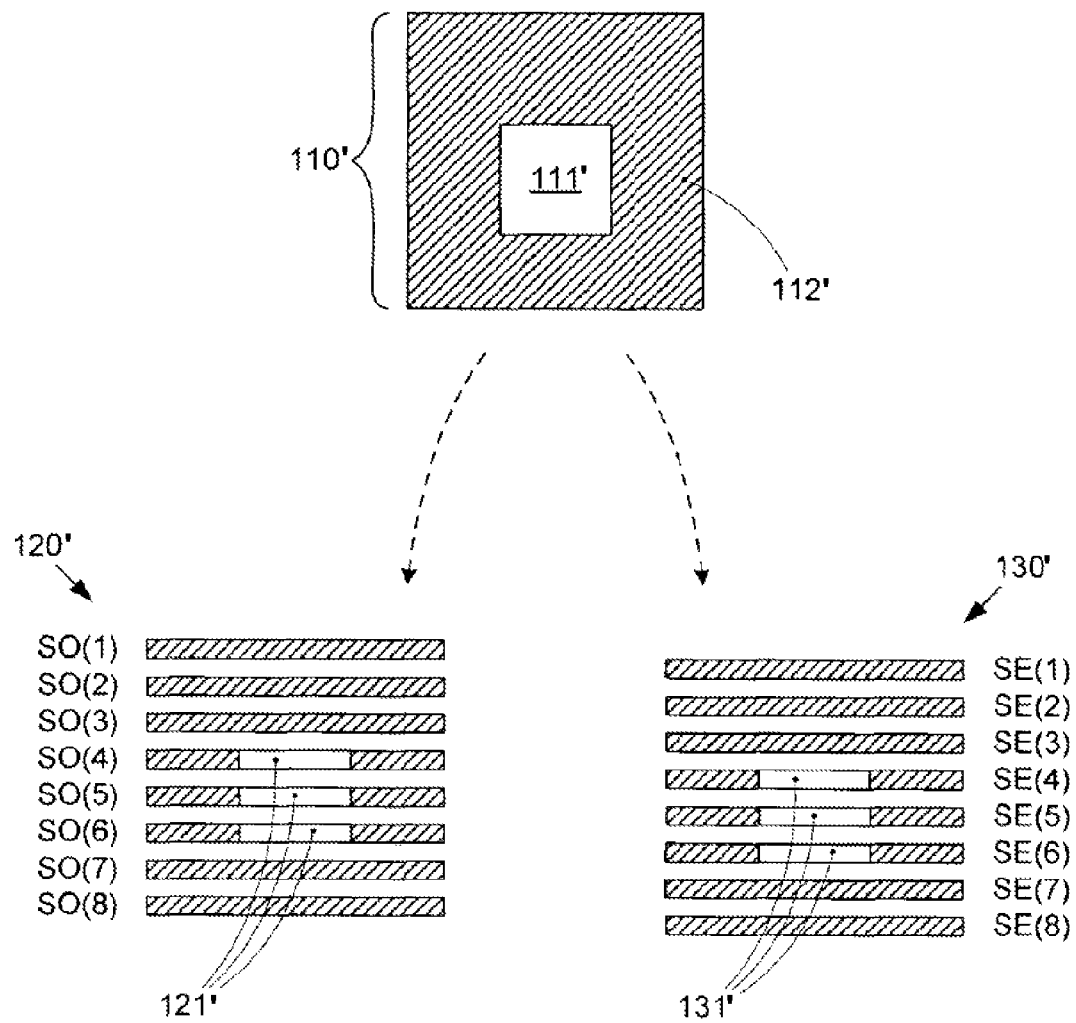
FIG. 1B is a diagram of the formation of an interlaced video signal.
Figure 1C:
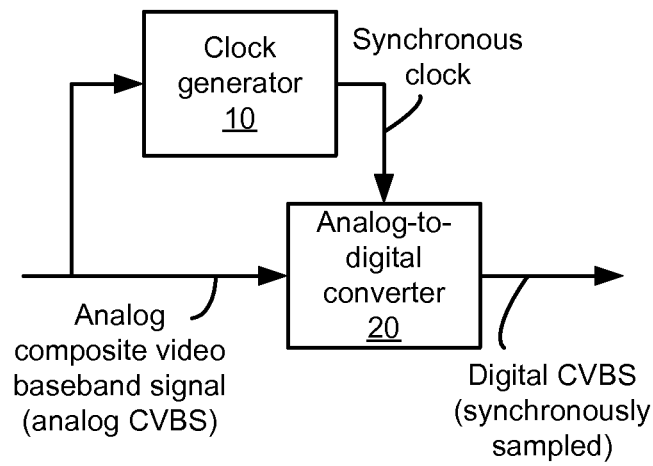
FIGS. 1C and 1D show an analog-to-digital converter and a clock generator.
Figure 1D:
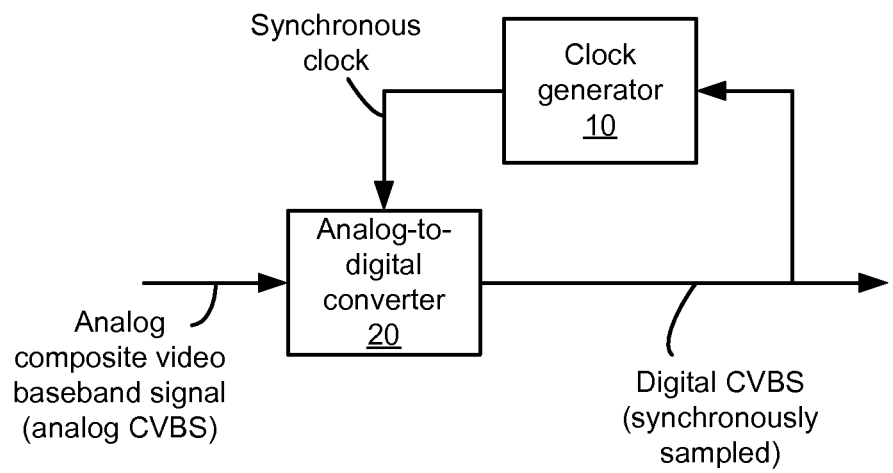

FIGS. 1C and 1D show a clock generator 10 and an analog-to-digital converter (ADC) 20. The clock generator 10 generates a synchronous clock, which is provided to the ADC 20. The ADC 20 also receives an analog composite video baseband signal (CVBS), synchronously samples the analog CVBS signal and outputs a digital CVBS signal. The generated clock signal is synchronized with the CVBS signal. The clock generator 10 may generate the synchronous clock based on a feed forward signal, as shown in FIG. 1C. In FIG. 1C, the clock generator 10 accepts the analog CVBS signal fed forward from the input port. Alternately, as shown in FIG. 1D, a feedback signal may supply the already digitized CVBS signal to the clock generator 10. Using a digital CVBS signal to generate the synchronous clock allows the clock generator 10 to be implemented in digital hardware or in a microprocessor/microcontroller.

Figure 2A:
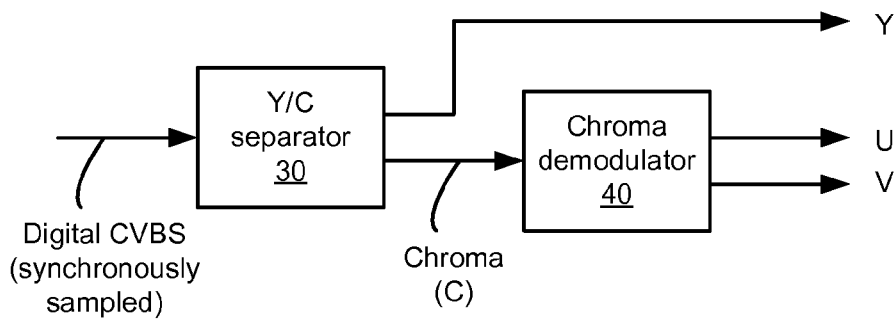
FIG. 2A shows luminance separation from a CVBS signal followed by chrominance separation based on a signal without luminance.

FIG. 2A shows a Y/C separator 30 and a chroma demodulator 40. In this configuration, luminance separation occurs prior to chrominance demodulation. A luminance separator (Y/C separator 30) accepts a digital CVBS signal, which has been synchronously sampled. The Y/C separator 30 extracts a luminance signal (Y) from the input digital CVBS signal. The Y/C separator 30 also extracts a chrominance signal (C) from the digital CVBS signal. After the luminance signal (Y) has been removed, the chrominance signal (C) still contains multiple color components. The chrominance demodulator (chroma demodulator 40), also called a color decoder, separates color signals. For example, the chroma demodulator 40 may separate a first color signal (U) from a second color signal (V) and provide both signals as outputs.

Figure 2B:
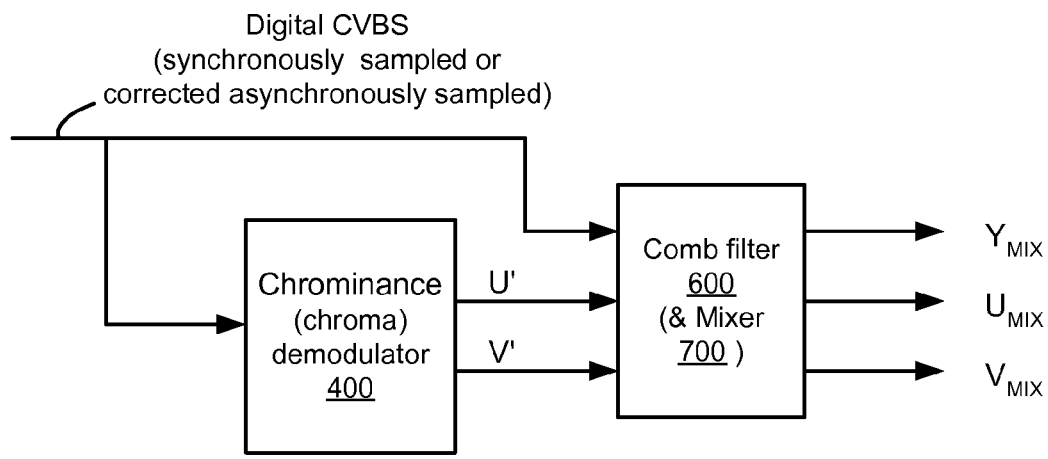
FIG. 2B shows chrominance separation from a CVBS signal followed by luminance separation, in accordance with the present invention.

FIG. 2B shows a chrominance demodulator (chroma demodulator 400, also referred to as a color decoder, UV color decoder or color demodulator), a comb filter 600 and an optional mixer 700, in accordance with the present invention. Both the chroma demodulator 400 and the comb filter 600 are supplied a digital CVBS signal, which in some embodiments is a synchronously sampled signal and in other embodiments is an asynchronously sampled signal. In still other embodiments, the digital CVBS signal is a corrected CVBS signal as described in detail below. In the embodiment shown, the chroma demodulator 400 first separates the first and second chrominance signals (e.g., first color signal U' and second color signal V') and then the comb filter 600 produces a luminance signal (e.g., Y). An optional mixer 700 may be used to further refine the luminance and/or chrominance signals by mixing and scaling spatial, temporal and/or filtered luminance and chrominance signals to produce final output signals $Y_{MIX}$, $U_{MIX}$ and $V_{MIX}$.

As shown in FIG. 2B, luminance separation occurs after chrominance demodulation unlike the configuration shown in FIG. 2A. A source of CVBS is supplied to both a chrominance (chroma) demodulator 400 as well as to a comb filter 600, which may include an internal mixer 700 or a external mixer. The chroma demodulator 400 separates raw chrominance signal components (e.g., U' & V'). The comb filter 600 accepts the raw chroma signals in addition to the corrected CVBS signal and produces a mixed luminance signal ($Y_{MIX}$) and two mixed chrominance values ($U_{MIX}$ & $V_{MIX}$).

Unlike the previous configuration shown in FIG. 2A, in FIG. 2B the raw chrominance signals (U' & V') are generated first then used to generator the luminance signals (Y or $Y_{MIX}$) and possibly refined chrominance signals ($U_{MIX}$ & $V_{MIX}$).

The source of the CVBS signal may convert a gamma-corrected red, green and blue (R'G'B') signal to a monochrome luminance (Y) by the weighting formula, such as Y=0.299*R'+0.587*G'+0.114*B'. This source is also referred to as corrected CVBS. The source may also convert the R'G'B' signal to first and second chrominance signals, which may be U & V or equivalently I & Q or other pair of orthogonal vectors or pseudo-orthogonal vectors. Once Y is determined, the color information, in the form of a first color signal and a second color signal, may be derived from the R'G'B' signal with the following weighting formula: U=0.492*(B'−Y) and V=0.877*(R'−Y); or I=0.736*(R'−Y) 0.268*(B'−Y) and Q=0.478*(R'−Y)+0.413*(B'−Y). The source of the CVBS signal modulates the first and second color signals to a phasor signal. For example, the U & V (or equivalently, I & Q) values are used to modulate a subcarrier signal (e.g., $f_{SC}$=3,579,545 Hz≈3.58 MHz) to produce a color value C. For example, C=Q*sin(ωt+33°)+I*cos(ωt+33°), where ω=2π$f_{SC}$.

Figure 3:
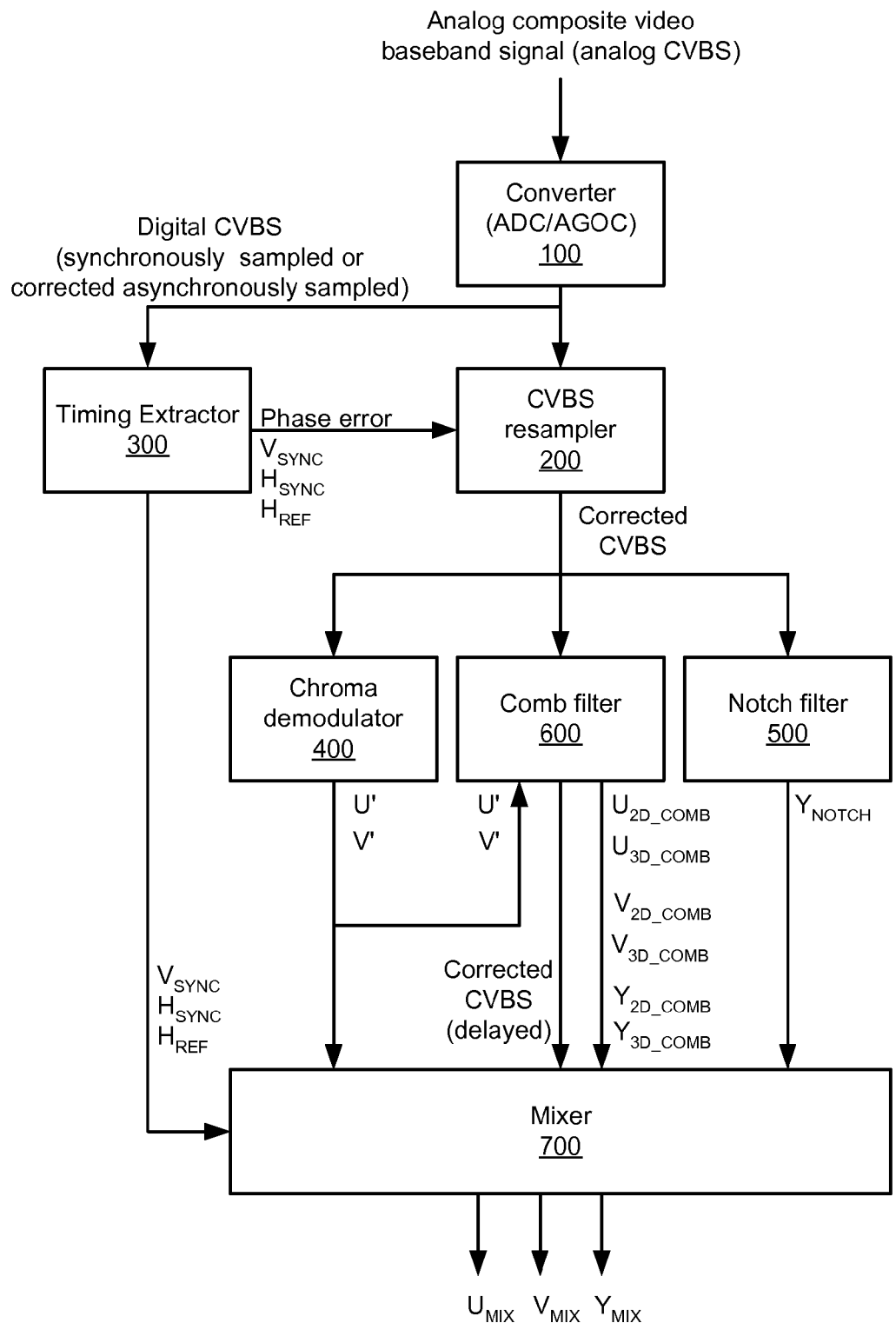
FIG. 3 illustrates a digital video decoder architecture, in accordance with the present invention.

FIG. 3 illustrates a digital video decoder architecture and FIGS. 4A, 5B, 4C, 4D and 4E show inputs and outputs of logic in the digital video decoder architecture of FIG. 3, in accordance with the present invention. FIG. 3 shows a converter 100, a CVBS resampler 200, a timing extractor 300, a chroma demodulator 400, a notch filter 500, a comb filter 600, and a mixer 700, each discussed in more detail below with reference to the remaining figures. These blocks (100-700) may be implemented in a microprocessor, a microcontroller, an ASIC or a VLSI hardware and the like, as well as in combinations thereof.

The converter 100 transforms an analog CVBS signal into a digital CVBS signal. The converter 100 received an analog composite baseband (CVBS) signal at an input port and provides a digital CVBS signal at an output port. In some embodiments, the digital CVBS signal is synchronously sampled as described with reference to FIGS. 1C and 1D above. In other embodiments, the digital CVBS signal is asynchronously sampled. The converter 100 includes an analog-to-digital converter (ADC) and may also contain an automatic gain control (AGC) circuit or automatic gain and offset control (AGOC) circuit. The converter 100 is described further below with reference to FIGS. 5A, 5B and 5C.

Figure 4A:
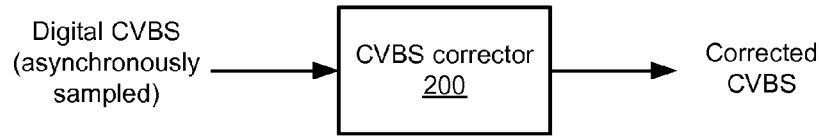
FIGS. 4A, 4B, 4C, 4D and 4E show inputs and outputs of logic in a digital video decoder architecture, in accordance with the present invention.

The CVBS resampler 200, also shown in FIG. 4A, generates a corrected CVBS signal based the digital CVBS signal received from the converter 100. The CVBS resampler 200 corrects errors introduced by asynchronous sampling. Furthermore, the CVBS resampler 200 corrects errors inherent in the CVBS signal itself. For example, a CVBS signal may be elongated in time because a video tape medium is stretched during playback. The CVBS resampler 200 is described further below with reference to FIGS. 6A, 6B, 6C, 6D, 6E, 8, 11A, 11B, 11C and 11D.

Figure 4B:
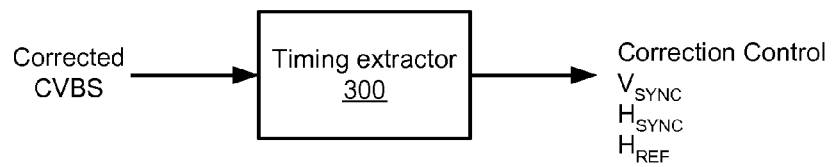

The timing extractor 300, also shown in FIG. 4B, extracts timing signals from a digital CVBS signal. The timing signals may include a vertical synchronization signal ($V_{SYNC}$), a horizontal synchronization signal ($H_{SYNC}$), a horizontal reference signal ($H_{REF}$), and a phase error signal. In some embodiments, the digital CVBS signal is a synchronous CVBS signal from the converter 100. In other embodiments, the digital CVBS signal is an asynchronous CVBS signal from the converter 100. In still other embodiments, the digital CVBS signal is a corrected CVBS signal from the CVBS resampler 200. The timing extractor 300 is described further below with reference to FIGS. 6A, 6B, 6C, 6D, 6E, 7, 8, 9 and 10.

Figure 4C:
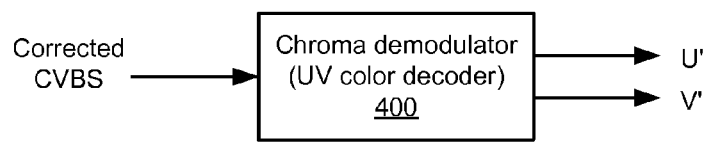
Figure 4D:
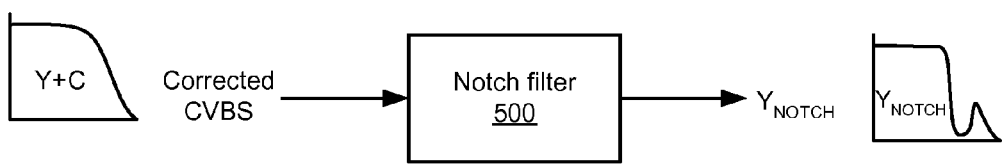

The chroma demodulator 400, described with reference to FIG. 2B and FIG. 4C, generates color signals (e.g., U' and V') based on the corrected CVBS signal. The notch filter 500, also shown in FIG. 4D, filters the corrected CVBS signal to generate a luminance signal ($Y_{NOTCH}$). The notice filter 500 attempts to remove the color spectrum (C) from the CVBS (Y+C) signal thereby primarily leaving the luminance spectrum ($Y_{NOTCH}$).

Figure 4E:
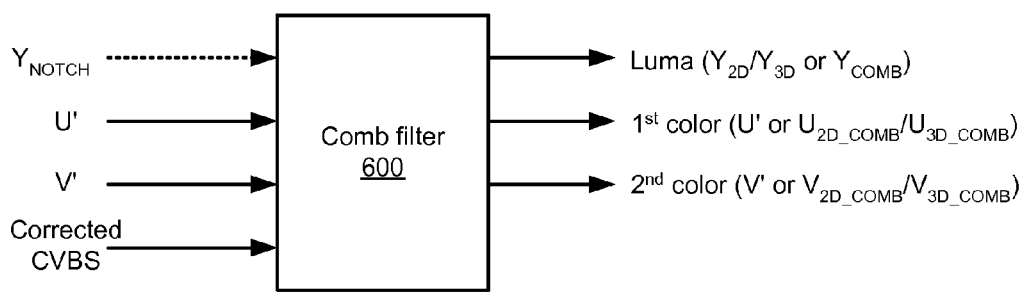

The comb filter 600, also shown in FIG. 4E, filters the corrected CVBS signal to generate a luminance signal based on the color signals. The comb filter 600 may generate a spatial luminance ($Y_{2D\_COMB}$) and a temporal luminance ($Y_{3D\_COMB}$). Alternative embodiments of the comb filter 600 may generate a luminance value ($Y_{COMB}$) that pre-mixes the spatial and temporal luminance values. The comb filter 600 may also filter the corrected CVBS signal to generate spatial chrominance signals (e.g., $U_{2D\_COMB}$ and $V_{2D\_COMB}$) and a temporal chrominance signals (e.g., $U_{3D\_COMB}$ and $V_{3D\_COMB}$) based on the corrected CVBS signal and the color signals (e.g., U' and V') from the chroma demodulator 400. Alternatively, the comb filter 600 may pre-mix the spatial color signals with color demod signals (U' & V') from the chroma demodulator 400 to generate a set of spatial filtered color values (e.g., $U_{2D}$ & $V_{2D}$). Alternatively, the comb filter 600 may pre-mix the color signals to generate a set of comb filtered color values (e.g., $U_{COMB}$ & $V_{COMB}$). Alternatively, the color signals (U' & V') may either pass through or bypass the comb filter 600. Also, delay circuitry may be included within or external to the comb filter 600 to provide a delayed version of the corrected CVBS signal or other generated luminance and/or chrominance signals. Each of these alternative embodiments of the comb filter 600 is described further below with reference to FIGS. 12A, 12B, 13, 14, 15A, 15B, 16, 17, 18, 19A-B, 20A-B, 21A-B, 22 and 23.

The mixer 700 of FIG. 3 weights and combines the luminance signals ($Y_{NOTCH}$, $Y_{2D\ COMB}$ and $Y_{3D\ COMB}$, or $Y_{NOTCH}$, $Y_{COMB}$) and chrominance signals (e.g., U', $U_{2D}$, $U_{3D}$, V', $V_{2D}$ and $V_{3D}$, or U', $U_{COMB}$, V', $V_{COMB}$) to produce a resulting luminance signal ($Y_{MIX}$) and set of resulting chrominance signals (e.g., $U_{MIX}$ and $V_{MIX}$). The mixer 700 is described further below with reference to FIGS. 19, 24, 25, 26 and 27.

Figure 5A:
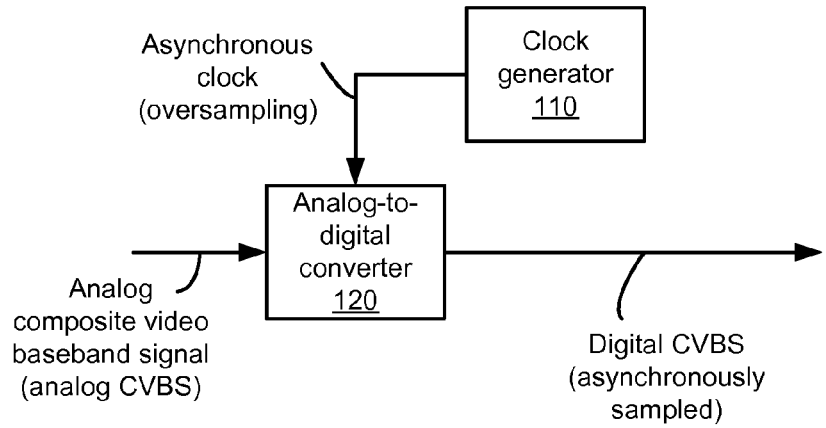
FIGS. 5A, 5B and 5C show elements of an analog-to-digital conversion process.
Figure 5B:
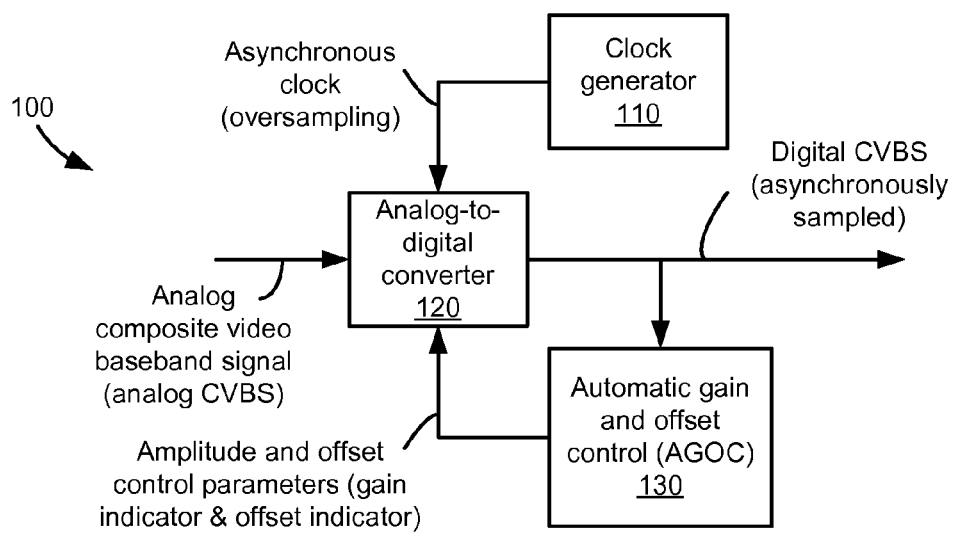
Figure 5C:
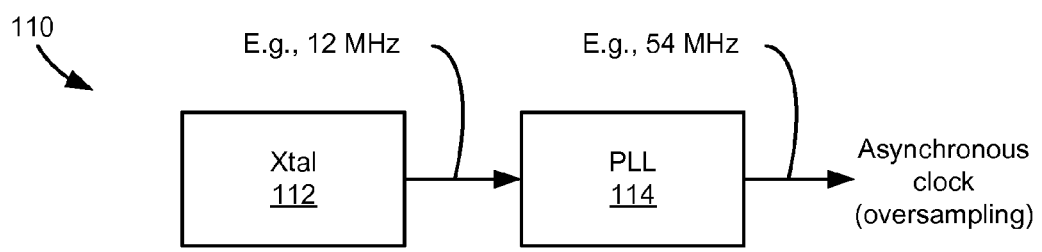

FIGS. 5A, 5B and 5C show elements of an analog-to-digital conversion process. FIG. 5A includes a clock generator 110 supplying an asynchronous clock to an analog-to-digital converter (ADC) 120. In the case of asynchronous sampling, the clock signal is generated from a source that is asynchronous from timing in the CVBS signal. For example, the source may be a crystal or free running circuit such as a phase locked loop (PLL). The analog-to-digital converter 120 uses the asynchronous clock to oversample and transform an analog CVBS signal into a digital CVBS signal, which is thereby both asynchronously sampled and oversampled. Oversampling results when the frequency of a clock is at least twice great as the Nyquist frequency. In this case, a CVBS signal has a bandwidth of approximately 0 to 4.2 MHz or less than approximately 6 MHz. Therefore, the CVBS signal would have a Nyquist frequency of less than 12 MHz. Embodiments of the present invention use a sampling frequency of at least twice the signal's Nyquist frequency. For example, embodiments of the present invention may use a sampling frequency between 24 MHz and 100 MHz, such as 24 MHz (2× oversampling), 36 MHz (3× oversampling), 48 MHz (4× oversampling) or 60 MHz (5× oversampling). Some embodiments of the present invention may use a sampling frequency that is a non-integer multiple of the Nyquist sampling frequency (e.g., 54 MHz). In some embodiments, the oversampling frequency is programmable.

Conventionally, sampling at a rate far above the Nyquist rate leads to inefficient use of sampling bandwidth. That is, the oversampled data includes extra data, which is typically unneeded. In some embodiments of the current invention, oversampling provides extra data used by the CVBS resampler 200. The corrected CVBS data from the CVBS resampler 200 may be downsampled to an equivalent sampling frequency equal to or just greater than the input signal's Nyquist rate.

FIG. 5B includes the clock generator 110 and analog-to-digital converter 120 of FIG. 4A with the addition of an automatic gain and offset control (AGOC) circuit 130. The AGOC circuit 130 performs both automatic gain control (AGC) and automatic offset control (AOC). Some embodiments include just an AGC and not an AOC. Other embodiments include just an AOC and not an AGC, while still other embodiments include both an AGC and an AOC. The AGOC circuit 130 monitors the digital CVBS signal generated by the analog-to-digital converter 120 to make sure that the dynamic range of the converter 120 is more optimally utilized. For example, assuming the analog-to-digital converter 120 has an output voltage with a peak-to-peak voltage ($V_{PP}$) of 1 Volt. If an incoming analog CVBS signal shows a peak-to-peak voltage of 0.1 Volts (i.e., 10% of dynamic range of converter 120), the AGOC 130 may provide a control signal to the converter 120 to increase its amplitude by a factor of ten. Similarly if the incoming CVBS signal shows a DC offset that is too high or too low, the AGOC 130 may provide a second control signal to the converter 120 to adjust the offset seen at the output of the converter 120.

FIG. 5C shows a crystal (xtal 112) and a phase locked loop (PLL 114), in accordance with the present invention. In the embodiment shown, the crystal 112 provides a 12 MHz (e.g., with a stability of ±100 PPM) to the PLL 114. The PLL 114 may be programmable to produce various frequencies or may be designed to produce a single frequency (e.g., 54 MHz as shown). A clock produced in isolation from the input signal will be asynchronous from the input signal and thus termed an asynchronous clock.

FIGS. 6A, 6B, 6C, 6D and 6E show various horizontal scan lines for standard and non-standard baseband video signals.

Figure 6A:
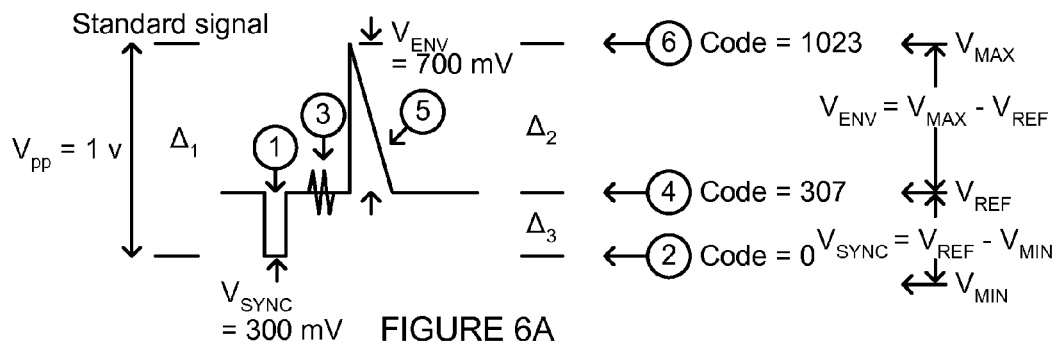
FIGS. 6A, 6B, 6C, 6D, 6E, and 6F show various horizontal scan lines for standard and non-standard baseband video signals.

In FIG. 6A, a standard-dimensioned horizontal scan line from a CVBS signal is shown. The standard horizontal scan line signal has a peak-to-peak voltage ($\Delta_1 = V_{PP} = V_{MAX} - V_{MIN}$) of 1 Volt, a sync pulse ($V_{SYNC} = V_{REF} - V_{MIN}$) of 300 millivolts (mV) below a blanking level ($V_{REF}$), and a maximum envelope voltage ($V_{ENV} = V_{MAX} - V_{REF}$) of 700 mV above the blanking level ($V_{REF}$). Using a 10-bit ADC, the minimum is shown at symbol 2 and may be identified as a digital code 0 from the ADC 120. The blanking level ($V_{REF}$) is shown at symbol 4 and may be identified as a digital code 307. The maximum voltage ($V_{MAX}$) is shown at symbol 6 and may be identified as a digital code 1024. The difference between the blanking level (code 307) and the maximum (code 1023) may be referred to as $\Delta_2$ or the envelope voltage ($V_{ENV}$). The difference between the blanking level (code 307) and the minimum (code 0) may be referred to as $\Delta_3$ or the sync level ($V_{SYNC}$). A standard signal will also have a ratio of $\Delta_2 : \Delta_3$ of 7:3 from the desired values $V_{ENV\_DESIRED} = 700$ mV to $V_{SYNC\_DESIRED} = 300$ mV.

The horizontal synchronization pulse (sync pulse), at symbol 1, starts at the blanking level $V_{REF}$, falls to the minimum voltage $V_{SYNC}$ for 4.7 microseconds (μs), and then returns to the blanking level $V_{REF}$. A color burst, at symbol 3, follows the sync pulse. The color burst is a subcarrier burst with a duration of approximately 5.6 μs (PAL) or 5.3 μs (NTSC). The luminance and chrominance data is encoded in an envelope, at symbol 5. The luminance and chrominance envelope varies in amplitude ($V_{ENV}$) depending on the encoded luminance and chrominance data.

Figure 6B:
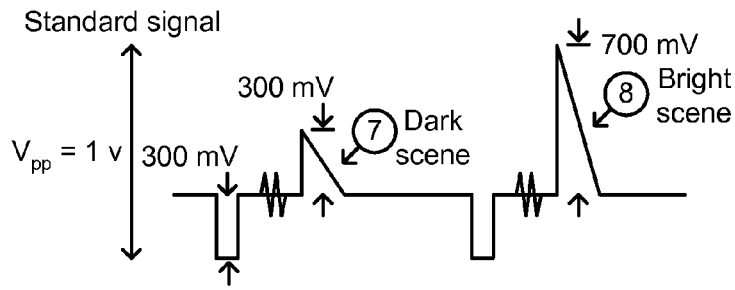

FIG. 6B shows two lines of encoded luminance and chrominance data. In the first envelope, a dark scene, at symbol 7, is shown having an envelope magnitude of $V_{ENV} = 300$ mV, which happens to be the same magnitude of the sync pulse ($V_{SYNC}$). A subsequent line has an envelope, at symbol 8, containing luminance and chrominance data representing a bright scene. This envelope has an amplitude of $V_{ENV} = 700$ mV above the blanking level. The figure illustrates that the luminance and chrominance envelopes vary in amplitude. As a consequence, a frame containing a sequence of lines with dark scenes may appear as having non-standard ratio of $\Delta_2 : \Delta_3$, when the lines actually have standard signal encoding. Over time, the envelop voltage ($V_{ENV}$) may be monitored to find its maximum, which will occur during bright scenes.

Figure 6C:
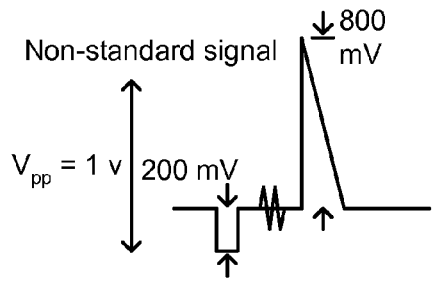

FIG. 6C shows a first non-standard signal. The first non-standard signal has a standard peak-to-peak voltage ($V_{PP} = 1$ V) however the ratio of $\Delta_2 : \Delta_3$ of 8:2 is beyond the possible ratio of 7:3 maximum of a standard signal. Determining that this signal is a non-standard signal may occur after observation of a single line of data. That is, a standard signal may never have an envelope that has a maximum amplitude that is more than 7/3 of the amplitude of the sync pulse. To transform this first non-standard signal into a standard signal requires forcing the ratio back to 7:3 by attenuating the signal during the luminance and chrominance envelope from a maximum of $V_{ENV} = 800$ mV to 700 mV and also amplifying the sync pulse from $V_{SYNC} = 200$ mV to 300 mV. In this case, the resulting transformed signal has a blanking level $V_{REF}$ that has been shifted up by 100 mV but keeps it peak-to-peak voltage of 1 V.

Figure 6D:
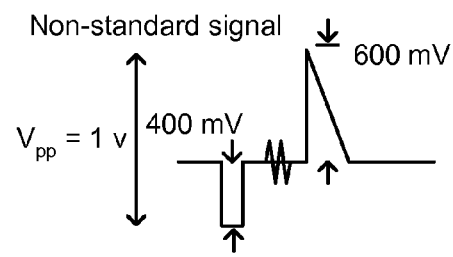

FIG. 6D shows a second non-standard signal. The second non-standard signal also has a standard peak-to-peak voltage ($V_{PP} = 1$ V), however, the ratio of $\Delta_2 : \Delta_3$ of 6:4 is below the standard ratio of 7:3. After a single observation, one cannot determine whether the line represent a dark scene or is from a non-standard CVBS signal. After observing several lines of data though, one expects to receive a variety dark and bright scenes. Therefore, if the maximum ratio ever received is 6:4, then the received signal represents a non-standard CVBS signal. To transform this second type of non-standard signal into a standard signal requires a similar procedure of forcing the ratio back to 7:3. The signal may be amplified during the luminance and chrominance envelope from its maximum of 600 mV to 700 mV and attenuated during the sync pulse from 400 mV to 300 mV. In this case, the resulting transformed signal has a blanking level the has been shifted down by 100 mV but also keeps it peak-to-peak voltage of 1 V.

Figure 6E:
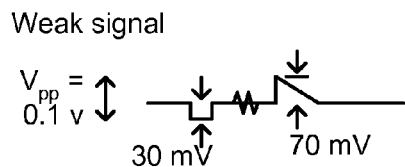

FIG. 6E shows a standard but weak signal. The signal has a below a non-standard peak-to-peak voltage ($V_{PP}$=0.1 V) but fortunately the ratio of $\Delta_2:\Delta_3$ of 7:3. Simple 10× amplification of the signal with appropriate offset control results in an adjusted signal having below a standard peak-to-peak voltage ($V_{PP}$=1 V) with a maintained ratio of $\Delta_2:\Delta_3$ of 7:3.

In some embodiments, the AGOC circuit 130 of FIG. 5B using a different set of amplitude and offset controls for each of the sync pulse period and the envelope period. In other embodiments, the AGOC circuit 130 of FIG. 5B using a common set of amplitude and offset controls for period of the CVBS signal including both the sync pulse period and the envelope period. In these embodiments, the AGOC circuit 130 selects the gain and offset control values based on the detected $V_{REF}$ and $V_{ENV}$ levels without regard to the $V_{SYNC}$ level. If the $\Delta_2:\Delta_3$ ratio is less than 7:3, as in the example of FIG. 6D, the bottom of the sync pulse will be clipped to thus maintaining a $V_{PP}$ less than or equal to 1 V.

The AGOC circuit 130 of FIG. 5B may monitor the output CVBS signal from the ADC 120 to measure signal parameters. The signal parameters may be used by the AGOC circuit 130 to adjust the amplitude and offset controls used by the ADC 120. The signal parameters may include: (1) a measure of the blanking level, $V_{REF}$; and (2) a measure of the maximum envelop voltage, $V_{ENV}$, with reference to the blanking level. These signal parameter may be measured over a period of time after receiving several lines of data. The AGOC circuit 130 uses these signal parameters to determine an offset and a gain to apply to the incoming CVBS signal, thereby resulting in a standard CVBS signal at the output port of the ADC 120.

Figure 6F:
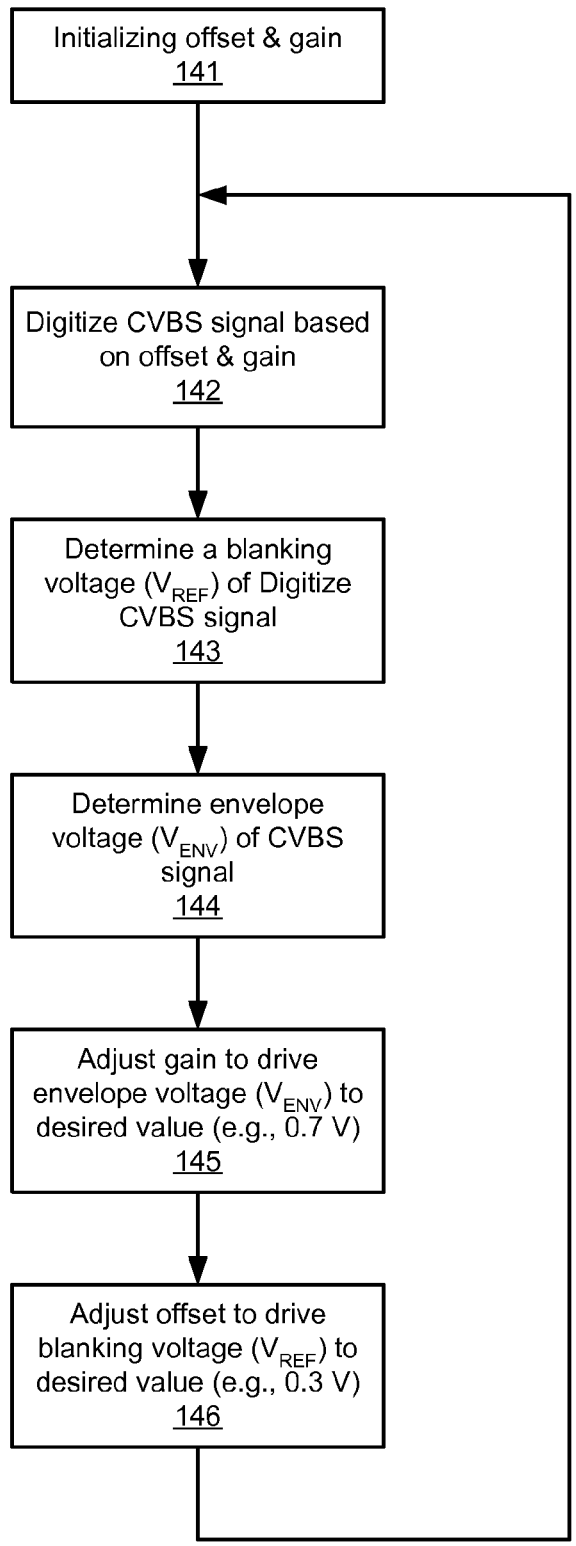

FIG. 6F shows a process to maintain and update gain and offset controls. At step 141, a gain parameter and an offset parameters, used by the ADC 120, are initialized to default levels. At step 142, the ADC 120 converts an analog CVBS signal into a digital CVBS signal based on the gain and offset parameters. At step 143, the AGOC 130 monitors the digital CVBS signal to determine a blanking voltage $V_{REF}$. With the digital signal, the blanking voltage will be represented by a code (e.g., code 307 from a 10-bit ADC). At step 144, the AGOC 130 determines an envelop voltage, which is the difference between the maximum signal level ($V_{MAX}$) and the blanking signal level ($V_{REF}$). Again, the maximum and blanking signal levels will be represented by other codes. The maximum signal level may be determined after several measurements of the envelope to increase the probability that at least one bright scene is encountered. The blanking signal level may be determined by examining a single line, for example, by determining at what level the signal resides when not within a sync pulse, a color burst or luminance and chrominance data envelope.

At step 145, the AGOC 130 determines a new gain for the ADC 120. The gain may be adjusted quickly to a determined gain or may be adjusted gradually, using a low pass filter of a sequence of determined gain values. The next gain ($G_{NEXT}$) may be set to the previous gain ($G_{PREV}$) scaled by the ratio of the desired envelope amplitude ($V_{ENV\_DESIRED}$) to the actual envelop amplitude ($V_{ENV}$), or $G_{NEXT}=G_{PREV}*(V_{ENV\_DESIRED}/V_{ENV})$.

At step 146, the AGOC 130 determines a new offset to drive the blanking voltage ($V_{REF}$) to a desired blanking voltage ($V_{REF\_DESIRED}$). Again, the offset may be adjusted directly to a determined offset or may be adjusted gradually, using a low pass filter of a sequence of determined offset values. The next offset ($OFFSET_{NEXT}$) may be set to the previous offset ($OFFSET_{PREV}$) adjusted by the error between the desired blanking amplitude ($V_{REF\_DESIRED}$) to the measured blanking amplitude ($V_{REF}$), or $OFFSET_{NEXT}=OFFSET_{PREV}+(V_{REF\_DESIRED}-V_{REF})$.

For example, assume the previous gain ($G_{PREV}$) was unity, the previous offset ($OFFSET_{PREV}$) was 0.0, the desired envelope amplitude ($V_{ENV\_DESIRED}$) is =0.7 V (relative code 716=1023−307) and the desired blanking amplitude ($V_{REF\_DESIRED}$) is 0.3 V (code 307). Further assuming that the non-standard CVBS signal of FIG. 6C is received, with $V_{PP}$=1 V, $V_{SYNC}$=0.2 V, $V_{REF}$=0.2 V, and $V_{ENV}$=0.8 V. The gain indicator may be computed as: $G_{NEXT}=G_{PREV}*(V_{ENV\_DESIRED}/V_{ENV})$=1*(0.7/0.8)=0.875 (an attenuation). The next gain may be set directly to the determined gain 0.875 or may be set to a value that approaches this determined gain. For example, the next gain may be an average of the previous gain (unity) and the determined gain (0.875), which would be (1+0.875)/2=0.9375 (a slight attenuation but not the full determined attenuation thereby reducing oscillations). Alternatively, another LPF could have been used to filter a sequence of determined gains to compute a gain that will be provided to the AGC 120. Similarly, the offset indicator may be computed as: $OFFSET_{NEXT}=OFFSET_{PREV}+(V_{REF\_DESIRED}-V_{REF})$=0+(0.3−0.2)=0.1 (a step up). Again, this offset may be used directly or may be filtered. For example, an average between the previous offset and the determined value (0.1+0.0)/2=0.05 may be used for the next offset.

As another example, assume that the non-standard CVBS signal of FIG. 6D is received, with $V_{PP}$=1 V, $V_{SYNC}$=0.4 V, $V_{REF}$=0.4 V, and $V_{ENV}$=0.6 V. The gain indicator may be computed as: $G_{NEXT}=G_{PREV}*(V_{ENV\_DESIRED}/V_{ENV})$=1*(0.7/0.6)=1.167 (an amplification). Similarly, the offset indicator may be computed as: $OFFSET_{NEXT}=OFFSET_{PREV}+(V_{REF\_DESIRED}-V_{REF})$=0+(0.3−0.4)=0.1 (a step down).

As a further example, assume that the standard but weak CVBS signal of FIG. 6E is received, with $V_{PP}$=0.1 V, $V_{SYNC}$=0.03 V, $V_{REF}$=0.03 V, and $V_{ENV}$=0.07 V. The gain indicator may be computed as: $G_{NEXT}=G_{PREV}*(V_{ENV\_DESIRED}/V_{ENV})$=1*(0.7/0.07)=10 (a 10× amplification). Similarly, the offset indicator may be computed as: $OFFSET_{NEXT}=OFFSET_{PREV}+(V_{REF\_DESIRED}-V_{REF})$=0+(0.3−0.03)=0.297 (a step up).

In some embodiments, a gain indicator and an offset indicator are set to drive the voltage between the blanking level and the maximum level of the signals to a first standard voltage (e.g., 0.7 V) and the blanking level to a second standard voltage (e.g., 0.3 V).

For example, the AGOC 130 measures a blanking level and a maximum level of a CVBS signal. The AGOC 130 compares the blanking level to a first target range for acceptable voltages of signal's blanking level (e.g., within a predetermined percentage of 0.3 V, within a range centered at a reference voltage of 0.3 volts, or within a range centered at a reference voltage of 30% of a dynamic range of the ADC).

The AGOC 130 also compares the maximum level to a second target range for acceptable maximum voltages (e.g., within a predetermined percentage of a maximum voltage of 1.0V). The blanking level or the maximum level is outside the acceptable ranges, the AGOC 130 adjusts a gain indicator. That is, if the blanking level is outside a first target range or the maximum level is outside a second target range then the AGOC 130 either increases or decreases the gain indicator feed to the ADC 120. For example, if the blanking level is below the first target range and the maximum level is below the second target range the AGOC 130 increases the gain indicator. If the blanking level is above the first target range or if the maximum level is above the second target range, the AGOC 130 decreases the gain indicator. In this way, the AGOC 130 adjusts the blanking and maximum levels independent of the signal's minimum level. A resulting signal has a blanking level within the first target range and a maximum level within the second target range. Since the maximum level and the blanking level are driven to particular voltages, the minimum level will be somewhere below the blanking level but not driven to a particular voltage.

After the AGOC 130 determines the gain and offset values, it sends updated gain and offset indicators to the ADC 120. These values may be absolute values as described above or may be step controls to indicate that a value should be incrementally increased or decreased as indicted by the step controls. In either case, the process of determining a gain and an offset is iterative, as shown by step 146 returning to step 142. In a steady state condition, the gain and offset indicators settle to fixed values and the maximum and blanking amplitudes of the digitized signal approach those of a standard signal.

In some embodiments, a gain is adjusted based on the maximum level and the blanking level as follows. If either a maximum level or a blanking level is too high, a subsequent gain is decreased. That is, if the maximum level is above a first target range or the blanking level is above a second target range, then the gain is decreased. If both the maximum level and blanking level are too low, a subsequent gain is increase. That is, if the maximum level is below the first target range and the blanking level is below the second target range, then the gain is increase. In all other cases, the gain is kept constant.

In some embodiments, a gain is adjusted based on a difference between the maximum level and the blanking level and based on the blanking level as follows. The maximum level and blanking level are determined. Next a difference is computed between the maximum level and blanking levels. If either the difference or the blanking level is too large, a subsequent gain is decreased. That is, if the difference is above a first target range or the blanking level is above a second target range, then the gain is decreased. If both the difference and blanking level are too low, a subsequent gain is increase. That is, if the difference is below the first target range and the blanking level is below the second target range, then the gain is increase. In all other cases, the gain is kept constant.

In some embodiments, an offset is adjusted based on a blanking level. If the blanking level too low, then the offset is increased. That is, if the blanking level is below a blanking target range (e.g., a value within an error of 0.3 V), then the offset is increased. If the blanking level too high, then the offset is decreased. That is, if the blanking level is above the blanking target range, then the offset is decreased.

In automatic gain control (AGC) embodiments, only a gain is adjusted and an offset control is not available. In automatic offset control (AOC) embodiments, only an offset is adjusted and gain control is not available. In automatic gain and offset control (AGOC) embodiments, both a gain and an offset are available for adjusting.

Changes to a gain or an offset may take priority over the other. In some embodiments, an offset is not adjusted if a gain needs to be adjusted. In these embodiments, adjustment of the gain, as described above, takes priority over adjustment of the offset. In other embodiments, a gain is not adjusted if an offset needs to be adjusted. In these embodiments, adjustment of the offset, as described above, takes priority over adjustment of the gain. In still other embodiments, the both the gain and the offset may be adjusted simultaneously.

To correct amplitude domain errors in the input signal, the AGOC 100 determines the gain and offset indicators as described above. To correct time domain errors (and phase errors) in the input signal, the CVBS resampler 200 may resample in the input signal as described in further detail below with reference to FIGS. 7A-11. The CVBS resampler 200 extracts horizontal and vertical timing information, used for system synchronization, from the digital CVBS signal. The CVBS resampler 200 uses the horizontal sync pulse from line to line to determine whether a line of data is of standard length or non-standard length. A line of data that is of non-standard length has either too few samples or too many samples. A non-standard line may occur from reading line data from a video tape medium. For example, the tape may be stretched, thereby resulting in too many samples. Alternatively, the tape play may be paying back data too quickly, thus resulting in too few samples. A non-standard line may also occur if segments of data where not received by the decoder.

FIGS. 7A, 7B, 7C and 7D show scan lines in relationship to digital timing, extraction and recovery, in accordance with the present invention. The CVBS resampler 200 may correct errors in sample timing within the raw digitized CVBS signal by a process of interpolation, expansion and/or compression.

Figure 7A:
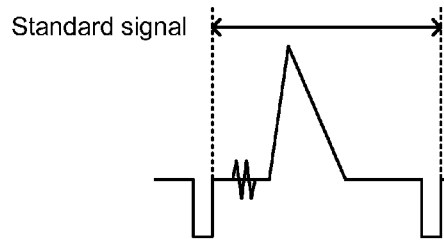
FIGS. 7A, 7B, 7C and 7D show scan lines in relationship to digital timing, extraction and recovery, in accordance with the present invention.
Figure 7A:
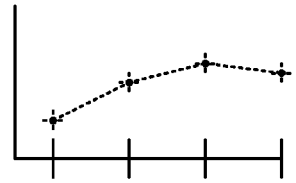

FIG. 7A illustrates samples from a horizontal scan line of a CVBS signal. On the left, the figure shows a full line including a first sync pulse delineating the beginning of the line and a second sync pulse delineating the end of the line. On the right, the figure shows four sample points made by the converter 100. A standard signal length has a duration between sync pulses of the inverse of the horizontal line frequency. A line of CVBS data having a duration between sync pulses of approximately 63.6 to 64 is (corresponding to 15.725 kHz for NTSC and 15.625 kHz for PAL) within a threshold may be considered to be a CVBS signal of standard period.

Figure 7B:
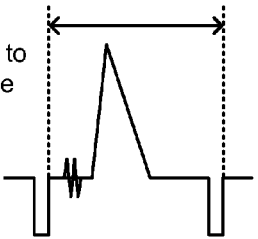
Figure 7B:
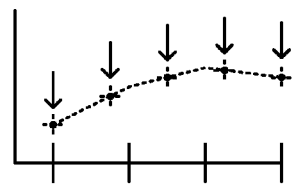

FIG. 7B illustrates samples from a horizontal scan line that is too short thus has too few samples. On the left, the figure shows a measured duration between sync pulses that shows a short duration line signal, which needs to be expanded to have additional samples. On the right, the figure shows that an original set of four samples has been replaced with five samples. Samples may be added by resampling the digital signal at an effective higher sampling rate needed to insert the desired number of samples. This resampling may be limited to the luminance and chrominance portion of the signal. Thus, the new resampled signal will have a proper number of samples within the envelope segment of the line signal.

Figure 7C:
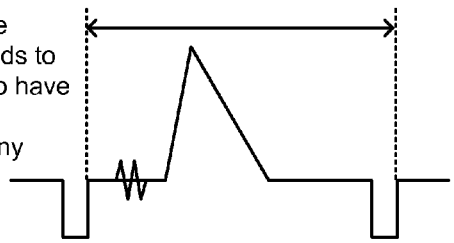
Figure 7C:
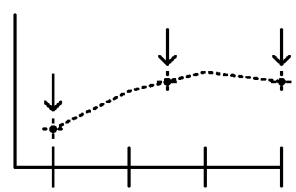

FIG. 7C illustrates samples from a horizontal scan line of a CVBS signal that is too long thus has too many samples. On the left, the figure shows a measured duration between sync pulses that shows a long duration line signal, which needs to be compressed to have reduce the total number of samples. On the right, the figure shows that an original set of four samples has been replaced with three samples. Samples may be removed by resampling the digital signal at an effective lower sampling rate needed to reduce the sample count to the desired number of samples. Again, the resampling may be limited to the luminance and chrominance portion of the signal.

As described above, a set of samples representing the luminance and chrominance envelope may be resampled to compress or expand the sampled data to form an envelope of standard length. When the data is of standard length, the luminance and chrominance data may be extracted from the envelope as described below. In some embodiments, the phase of the samples is also changed. In some embodiments, the phase is checked and changed after the signal has been expanded or compressed. In other embodiments, the phase is checked only if it was unnecessary to expand or compress the signal. In other embodiments, the phase is checked only if sampled data has a number of samples within a threshold.

Figure 7D:
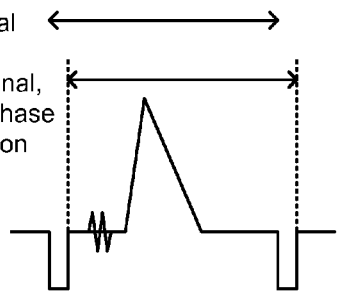
Figure 7D:
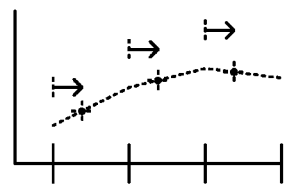

FIG. 7D illustrates samples from a horizontal scan line of a CVBS signal having a standard length. The samples are out of phase an ideal sampling time. The CVBS resampler 200 resamples the digital CVBS signal such that the new samples have a correct delay with respect to a reference point, for example, from the horizontal sync pulse. The CVBS resampler 200 may use an interpretation process to generate the new samples. For example, if the correct timing is 30% past one sample and 70% before the next sample, a simple line fitting algorithm may be used. Alternatively, a second or higher order curve fitting algorithm may be used. On the right of the figure, a line fitting algorithm has resulted in new samples formed from interpolation between pairs of samples.

In some embodiments, resampling to expand, compress and/or interpolate may include decimation to reduce the oversampled signal data to a signal sampled between the Nyquist rate and less than two times the Nyquist rate. Before a line of data is interpolation, expansion and/or compression, an accurate measure of the period between pairs of sync pulses is needed. This horizontal line timing may be determined from the digitized CVBS signal.

Figure 8A:
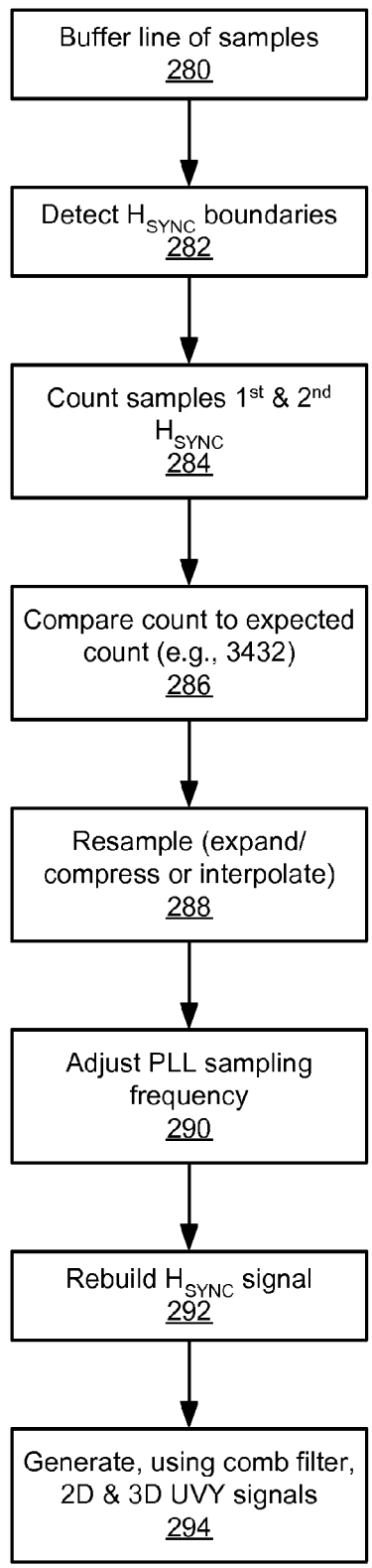
FIGS. 8A and 8B illustrates a process of digital timing, extraction and recovery, in accordance with the present invention.
Figure 8B:
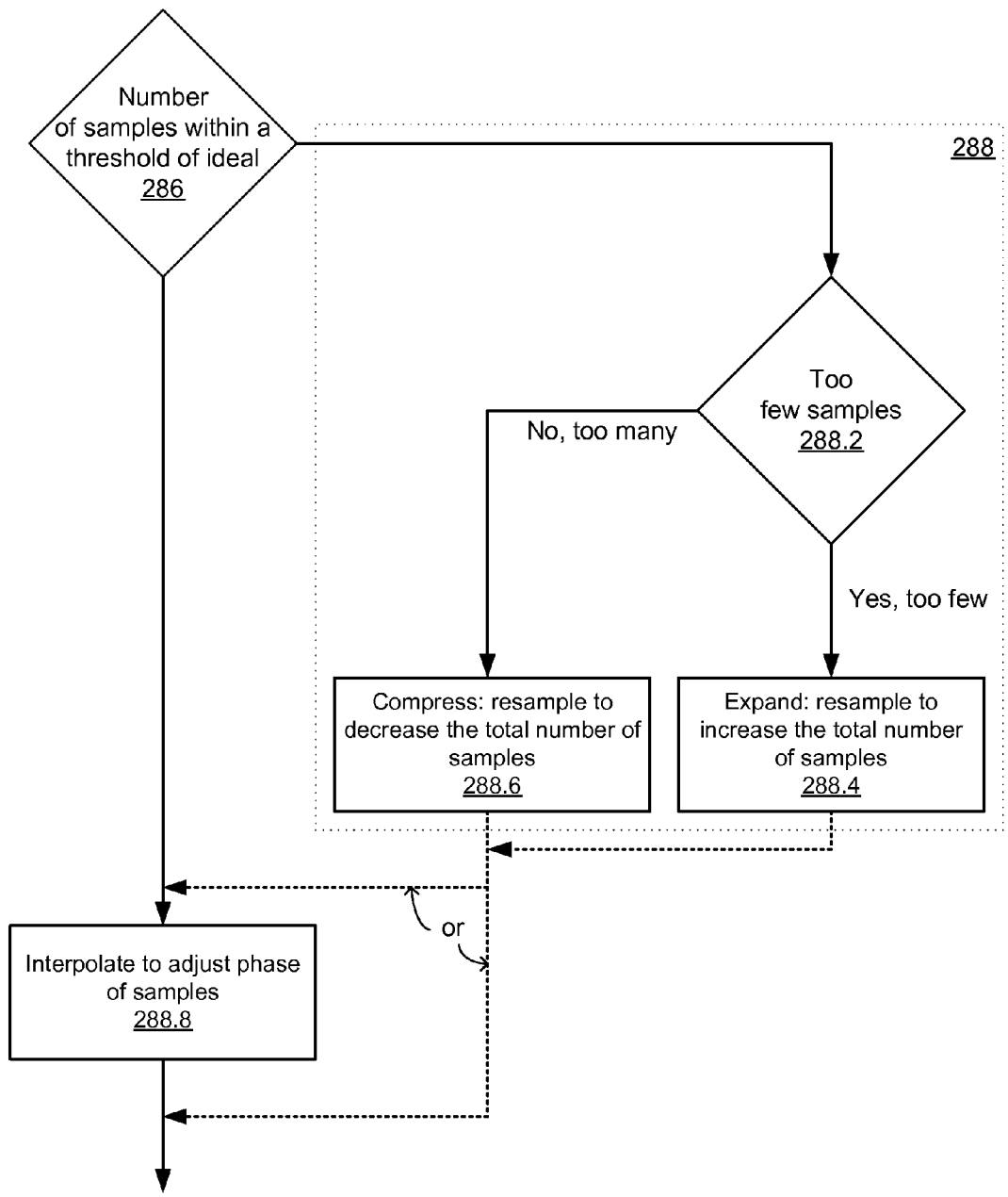

FIGS. 8A and 8B illustrate a process of digital timing, extraction and recovery, in accordance with the present invention. FIG. 8A shows a process in a digital video resampler and decoder leading up to interpolation, expansion and compression. At step 280, a horizontal line of sample is buffered into memory of an input buffer. This input buffer is coupled to a source of a video signal oversampled by at least two times and may contain more samples than contained in a single horizontal line. At step 282, the horizontal synchronization ($H_{SYNC}$) are detected by a horizontal synchronization detector coupled to the input buffer. The horizontal synchronization detector detect horizontal synchronization boundaries. A first boundary may have been detected with processing of an immediately preceding horizontal scan line. Similarly, a second boundary detected in the current scan line may be used when processing the immediately following horizontal scan line. At step 284, a counter, coupled to the horizontal synchronization detector, counts a number of samples from between the detected horizontal synchronization boundaries. This counter may count samples after both the first and second $H_{SYNC}$ boundaries have been established. Alternatively, the counter may count samples either as they arrive into the buffer or during detection of the second horizontal synchronization boundary. At step 286, a comparator, coupled to the counter, compares the counted number of samples to a reference count. The reference count may be the desired number of samples (e.g., 3432 with 4× oversampling) or may be a range of acceptable samples (e.g., =3424 to 3440=3432±8).

At step 288, a sample corrector, such as CVBS resampler 200 that is coupled to the input buffer, modifies a block of samples based on a comparison result from the comparator. For example, if the comparator shows too many samples exist between the first and second $H_{SYNC}$ signals, then the sample corrector compresses the number of samples. Similarly, if too few samples exists, then the sample corrector expands the number of samples. In either case or when the number of samples is within a desirable range, the samples may be interpolated to correct the timing resulting from asynchronous sampling or signal mistiming. Steps 286 and 288 are described further below with reference to FIG. 8B.

At step 290, a sampling frequency of the PLL 114 may be adjusted to better track the desired clock frequency and/or phase. At step 292, an $H_{SYNC}$ signal may be rebuilt. At step 294, a comb filter 600 may be used to generate a temporal luminance signal (e.g., $Y_{3D\_COMB}$). The comb filter 600 may also be used to generate a first and second temporal chrominance signals (e.g., $U_{3D\_COMB}$ & $Y_{3D\_COMB}$). Furthermore, the comb filter 600 may be used to generate spatial luminance and chrominance signals (e.g., $Y_{2D\_COMB}$, $U_{2D\_COMB}$ & $U_{2D\_COMB}$).

FIG. 8B shows two alternative implementations of steps 286 and 288. At step 286, a comparator, coupled to the counter, compares the counted number of samples to a reference count. The reference count may be the desired number of samples (e.g., 3432 with 4× oversampling) or may be a range of acceptable samples (e.g., =3424 to 3440=3432±8, where ±8 is the threshold). Alternatively, the threshold may be set to zero (0) or another value representing a percentage error (e.g., a threshold of ±1% at 4× oversampling represents ±34 samples; a threshold of ±0.5% represents ±17 samples; and a threshold of ±0.1% represents ±3 samples). If a desired number of samples within the threshold exists in the current line of digital CVBS data, then follow skips step 288 and continues to step 288.8. If the counted number of samples is outside the threshold, then flow continues to step 288, which includes steps 288.2, 288.4 and 288.6. At step 288.2, a determination is made as two whether a counted number of samples between two reference points (e.g., between the first and second horizontal synchronization pulses) above (too many samples) or below (too few samples) the threshold count of an ideal or expected number of samples. If too few samples exist, then processing continues at step 288.4. At step 288.4, the current line of samples is expanded such that a desired number of samples exists. For example, the current samples may be resampled to increase the total number of samples in a line. Alternatively, if too many samples exist, then processing continues at step 288.6. At step 288.6, the current line of samples is compressed such that a desired number of samples exists. For example, the current samples may be resampled to decrease the total number of samples in a line. In a first embodiment, steps 288.4 and 288.6 exit to execute step 288.8. In a second embodiment, steps 288.4 and 288.6 exit and bypass step 288.8. Flow then continues to step 290 in FIG. 8A. As a result of processing steps 288.4, 288.6 and 288.8, the sample corrector fills an output buffer with a modified block of samples. If no adjustment to the samples was made, the output buffer may linked to the input samples.

Figure 9:
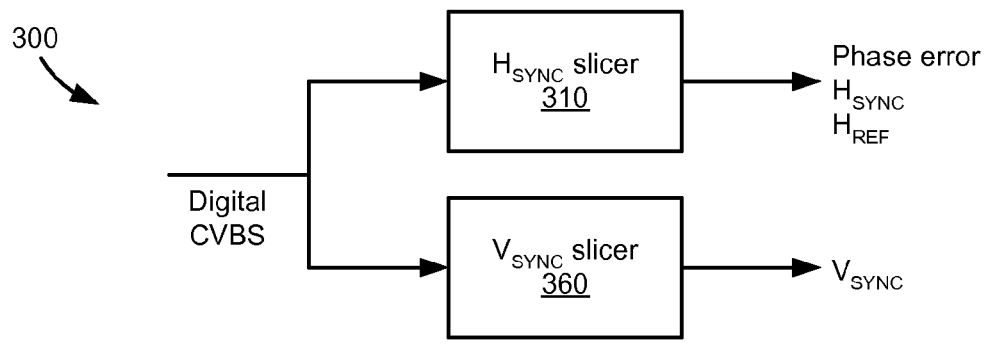
FIG. 9 shows synchronization logic, in accordance with the present invention.

FIG. 9 shows synchronization logic, in accordance with the present invention. The synchronization logic, such as the timing extractor 300 in FIG. 3, includes a horizontal synchronization slicer ($H_{SYNC}$ slicer 310) and a vertical synchronization slicer ($V_{SYNC}$ slicer 360). Both $H_{SYNC}$ slicer 310 and $V_{SYNC}$ slicer 360 accept an uncorrected digital CVBS signal. That is, raw samples are supplied to slicers 310 and 360 rather than samples corrected by the CVBS resampler 200. The $H_{SYNC}$ slicer 310 analyzes the input samples to detect horizontal synchronization pulse ($H_{SYNC}$), horizontal reference pulses ($H_{REF}$) and phase error. In turn, the $H_{SYNC}$ slicer 310 provides these generated signals as reference signals to circuitry internal to the CVBS resampler 200, comb filter 600 and/or mixer 700. Similarly, the $V_{SYNC}$ slicer 360 analyzes the input samples to detect and generate a vertical synchronization pulses ($V_{SYNC}$)

Figure 10:
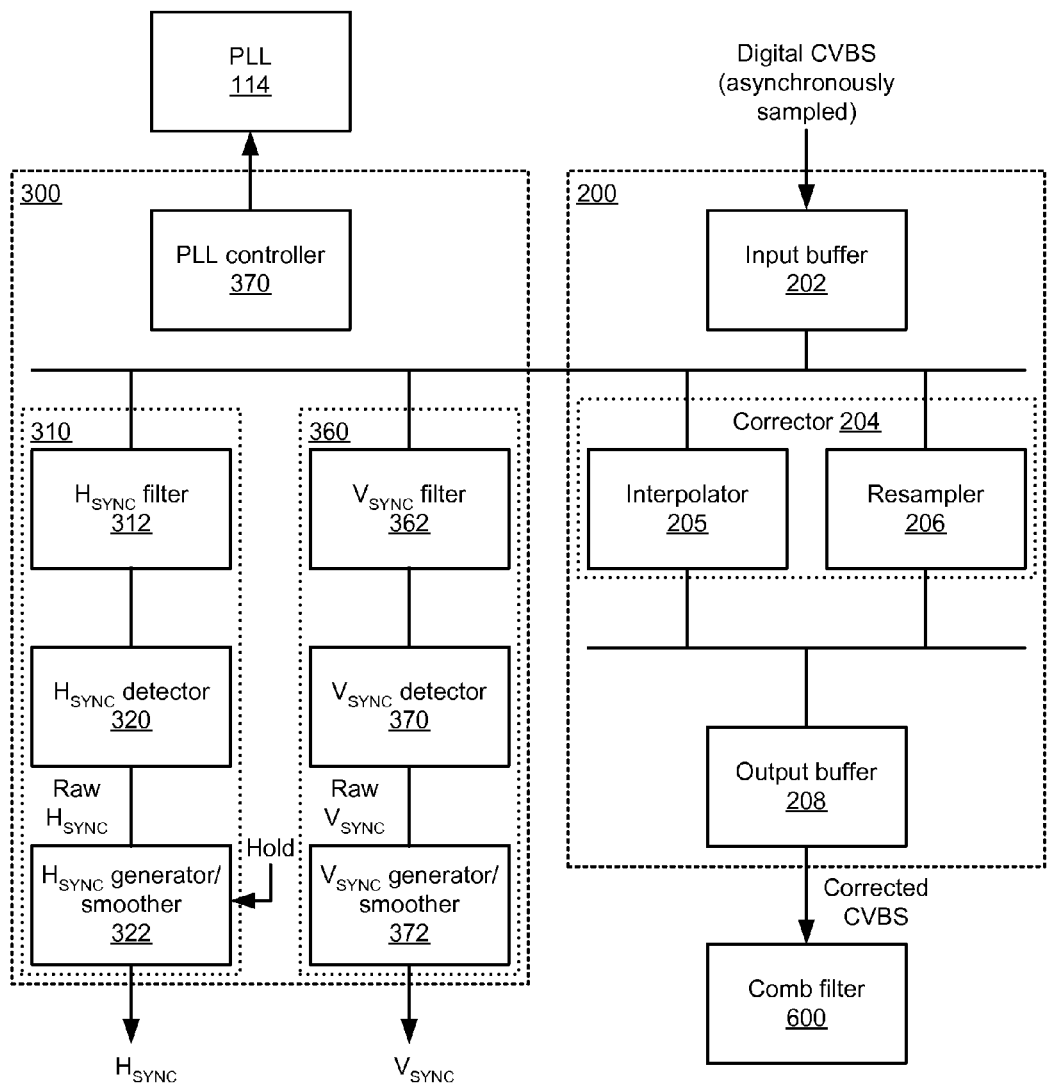
FIG. 10 shows circuitry in a CVBS resampler and a timing extractor, in accordance with the present invention.

FIG. 10 shows circuitry in a CVBS resampler 200 and a timing extractor 300, in accordance with the present invention. In the embodiment shown, the CVBS resampler 200 includes an input buffer 202 coupled to accept an input stream of sampled CVBS data. The input stream of sampled CVBS data may be asynchronously sampled. In other embodiments, the input stream of sampled CVBS data contains synchronously sampled data.

The CVBS resampler 200 also includes a corrector 204, which includes an interpolator 205 and a resampler 206. The interpolator 205 may operate to either expand or compress the number of samples (respectively in FIGS. 7B and 7C and steps 288.4 and 288.6 of FIG. 8B) and may use a first-degree or second-degree curve fitting algorithm or the like. The resampler 206 may operate to adjust the phase of the samples (in FIG. 7D and step 288.8 of FIG. 8B). The input buffer 202 supplies its data on a first data bus to the corrector 204. In some embodiments, data from the input buffer 202 is either interpolated by the interpolator 205 or phase adjusted by the resampler 206. Logic may make a decision on whether to interpolate or adjust phase based on the extent of the temporal error in the input signal. For example, if the input data contains a total number of samples within a threshold count of a standard signal, then the data may go through a phase adjusting process. If the input data contains too many or too few samples, then the data may go through an interpolation process. In other embodiments, data from the input buffer 202 is both interpolated by the interpolator 205 and phase adjusted by the resampler 206. For example, a line of input data may be first undergo an interpolation process then undergo a resampling process.

Additionally, the CVBS resampler 200 includes an output buffer 208 to hold the resulting output data from the interpolator 205 and the resampler 206. A second data bus may be used to couple the output data from the corrector 204 to the input of the output buffer 208. Functionally, the first and second data buses may be the same physical bus but used at different times. Similarly, the input buffer 202 and the output buffer 208 may share the same memory hardware. The output of the output buffer 208 provides a corrected CVBS set of samples to the comb filter 600 and other functional blocks (as shown in FIG. 3).

Figure 11:
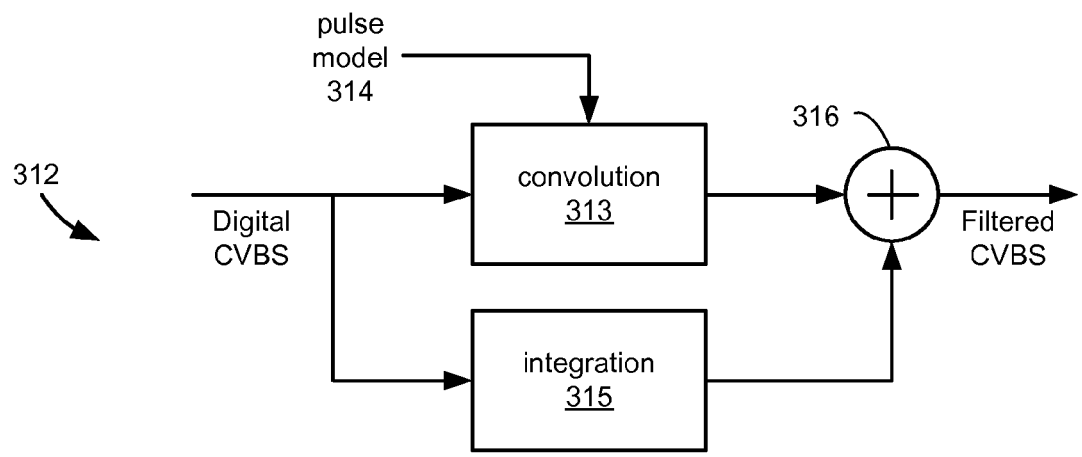
FIG. 11 shows a horizontal synchronization slicer, in accordance with the present invention.

The timing extractor 300 includes a PPL controller 370 coupled to the PLL 114 of FIG. 5C. The timing extractor 300 also includes a horizontal synchronization slicer ($H_{SYNC}$ slicer 310) including an $H_{SYNC}$ filter 312, an $H_{SYNC}$ detector 320 and an $H_{SYNC}$ generator/smoother 322. The $H_{SYNC}$ filter 312, as shown in FIG. 11, includes a convolution circuit 313 that accepts and convolves the digital CVBS signal with a pulse model signal 314. The $H_{SYNC}$ filter 312 also includes an integration circuit 315 that integrates the digital CVBS signal. The output signals from the convolution circuit 313 and the integration circuit 315 are combined by a combiner 316, which provides a resulting filtered CVBS signal used by the $H_{SYNC}$ detector 320.

The $H_{SYNC}$ detector 320 detects a horizontal synchronization pulse by analyzing the output of the $H_{SYNC}$ filter 312. For example, when the filtered data falls below a threshold for a number of samples, the $H_{SYNC}$ detector 320 may select the first, middle or last sample to represent the $H_{SYNC}$ transition. The resulting transition is supplied to the $H_{SYNC}$ generator/smoother 322 as a raw $H_{SYNC}$ signal.

The $H_{SYNC}$ generator/smoother 322 uses the raw $H_{SYNC}$ signal as an input to a PLL thereby generating a steady $H_{SYNC}$ signal. The $H_{SYNC}$ signal broadcasted is a periodic signal except during a vertical synchronization period. During the vertical synchronization period, no $H_{SYNC}$ signal is transmitted and therefore the raw $H_{SYNC}$ signal will not show a transition. A hold signal generated from the $V_{SYNC}$ slicer 320 described below switches the $H_{SYNC}$ generator/smoother 322 from a state driven by the raw $H_{SYNC}$ signal to a free running state holding the current PLL phase and frequency of the provided $H_{SYNC}$ signal. For a standard PAL signal, this generated $H_{SYNC}$ signal is designed to operate at or 15.625 kHz. For a standard NTSC signal, this generated $H_{SYNC}$ signal is designed to operate at 15.725 kHz.

The timing extractor 300 also includes a vertical synchronization slicer ($V_{SYNC}$ slicer 360) including a $V_{SYNC}$ filter 362, a $V_{SYNC}$ detector 370 and a $V_{SYNC}$ generator/smoother 372. The $V_{SYNC}$ filter 362 filters the incoming digital CVBS signal to provide a filtered CVBS signal to the $V_{SYNC}$ detector 370. The $V_{SYNC}$ detector 370 detects transitions corresponding to a vertical synchronization signal and provides this detected transition as a raw $V_{SYNC}$ signal to the $V_{SYNC}$ generator/smoother 372. The generated $V_{SYNC}$ signal may be used as a control signal for the circuitry shown in FIG. 3. For a standard PAL signal, this generated $V_{SYNC}$ signal is designed to operate at 50 Hz. For a standard NTSC signal, this generated $V_{SYNC}$ signal is designed to operate at 60 Hz.

Figure 12A:
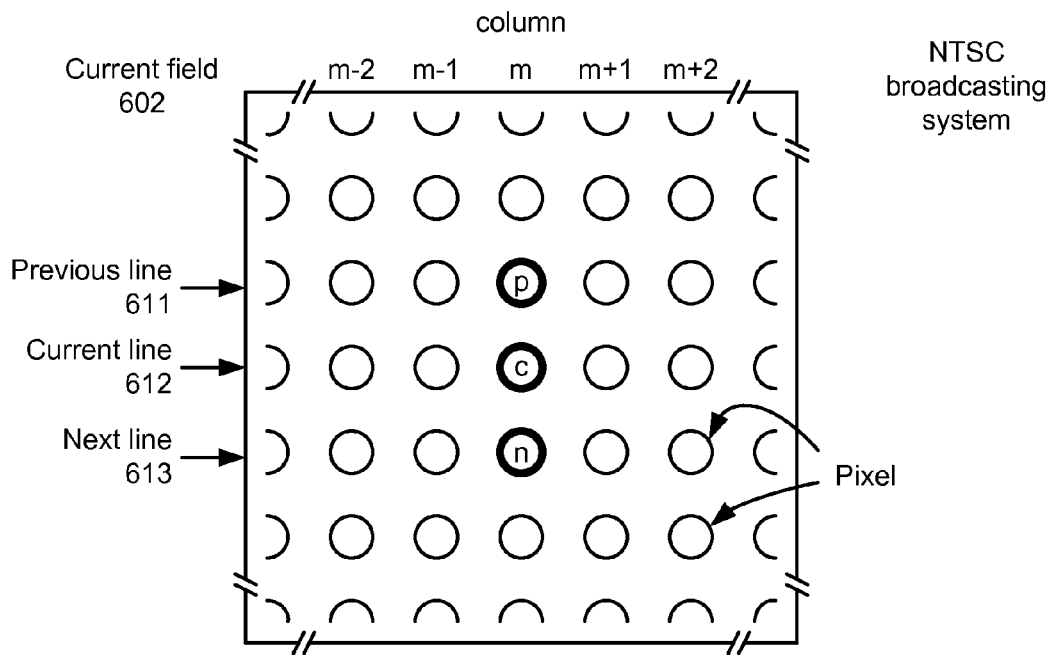
FIGS. 12A and 12B show lines and columns of a frame, in accordance with the present invention.
Figure 12B:
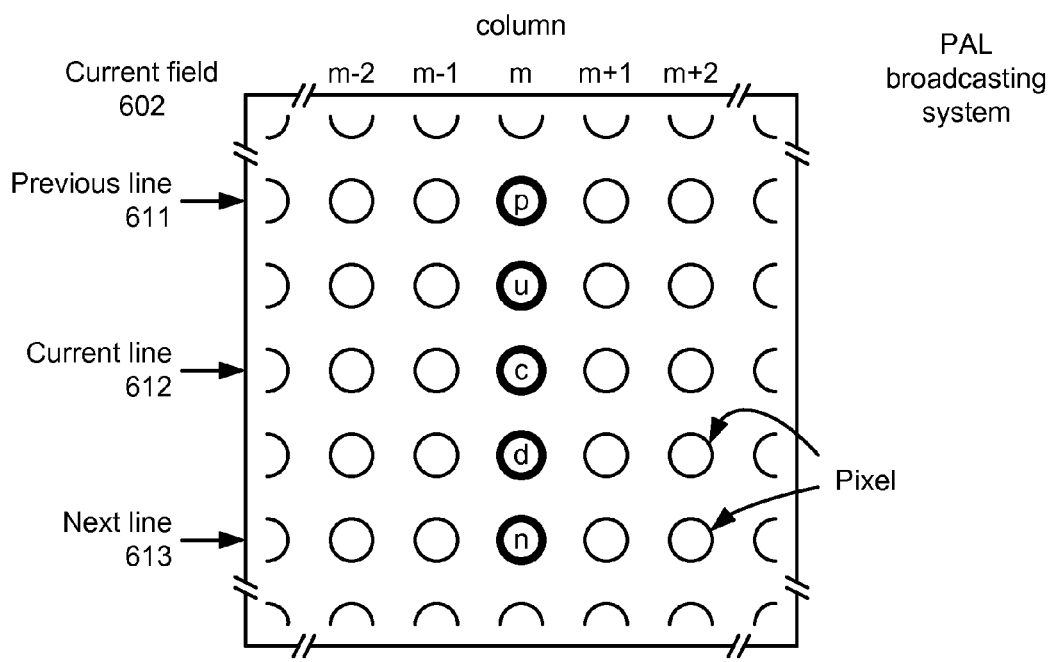

FIGS. 12A and 12B show lines and columns of a frame, in accordance with the present invention. FIG. 12A shows an array of pixel positions associated with a current field 602 from a CVBS signal within an NTSC broadcasting system. The array of pixels shown include columns m−2, m−1, m, m+1 and m+2, where column m is a column of current interest. The array of pixels shown also includes several lines of pixels including a previous line 611, a current line 612 and a next line 613. At the intersections of the column of interest (column m) and the lines of interest (611, 612 and 613) are pixel positions of interest. The pixel position in the column m and in the previous line 611 is labeled pixel p as the previous pixel. The pixel position in the current column m and in the current line 612 is labeled pixel c as the center pixel. The pixel position in the current column m and in the next line 613 is labeled pixel n as the next pixel.

FIG. 12B shows a similar array of pixel positions associated with a current field 602 from a CVBS signal within a PAL broadcasting system. The array of pixels shown includes columns m−2, m−1, m, m+1 and m+2, where column m is a column of current interest. The array of pixels shown also includes several lines of pixels including a previous line 611, a current line 612 and a next line 613. At the intersections of the column of interest (column m) and the lines of interest (611, 612 and 613) are pixel positions of interest. The pixel positions in the current column m and in lines 611, 612 and 613 are labeled pixel p, c and n respectively. Between pixels p and c and between pixels c and d are neighboring pixel u ("up") and neighboring pixel d ("down"), respectively.

Figure 13:
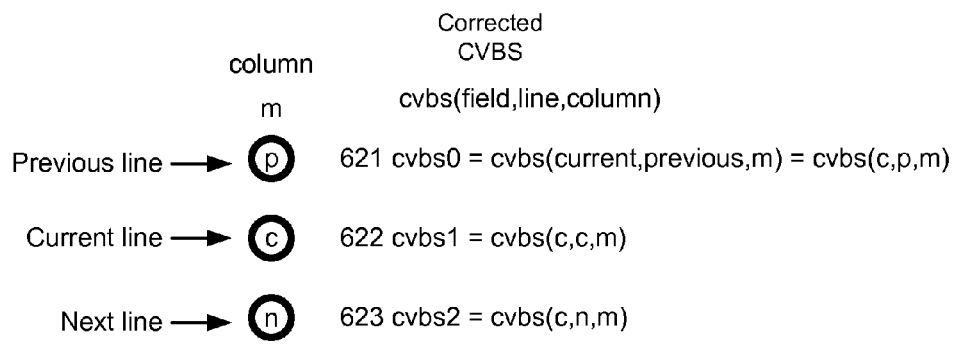
FIG. 13 relates pixels to variables, in accordance with the present invention.

FIG. 13 relates data associated with pixel positions p, c and n to variables, in accordance with the present invention. Variable cvbs0 621 represents corrected CVBS data associated with the current field 602, the previous line 611 and the current column m. Variable cvbs1 622 represents corrected CVBS data associated with the current field 602, the current line 612 and the current column m. Variable cvbs2 623 represents corrected CVBS data associated with the current field 602, the next line 613 and the current column m. Processed CVBS data associated pixel positions p, c and n are used for computing mixing spatial coefficients, luminance and chrominance values as described in further detail below.

Figure 14:
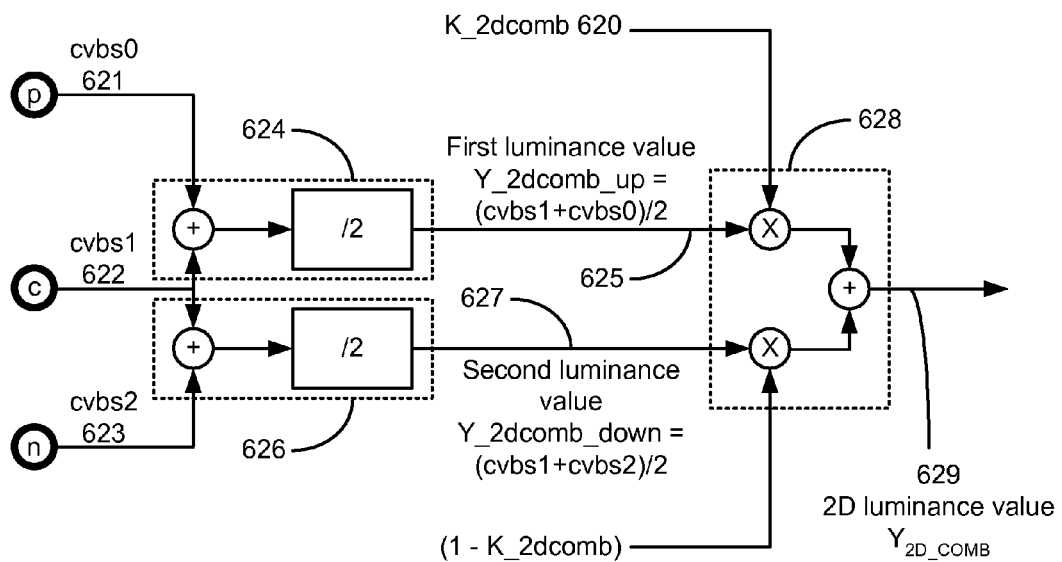
FIG. 14 shows circuitry for generating a 2D luminance value, in accordance with the present invention.

FIG. 14 shows circuitry for generating a 2D luminance value, in accordance with the present invention. The 2D luminance value ($Y_{2D\_COMB}$ 629) is based on the variables cvbs0 621, cvbs1 622 and cvbs2 623 as well as a mixing coefficient (K_2dcomb 620). In the embodiment shown, average luminance values are computed then mixed together. The first luminance value 625 is computed using a first averaging unit 624 including a summer to add cvbs0 621 and cvbs1 622 values followed by a divider to provide the result Y_2dcomb_up=(cvbs0+cvbs1)/2. The second luminance value 627 is computed using a second averaging unit 626 including a summer to add cvbs1 622 and cvbs2 623 values followed by a divider to provide the result Y_2dcomb_down=(cvbs1+ cvbs2)/2. Base on a mixing value (K_2dcomb 620), which is inclusively between zero and one, the first and second luminance values are scaled then summed with mixer 628. The resulting 2D luminance value ($Y_{2D\_COMB}$ 629) may be written as $Y_{2D\_COMB}$=K_2dcomb_up*Y_2dcomb_up+(1−K_2dcomb_up)*Y_2dcomb_down.

The mixing coefficient K_2dcomb 620 weights the line above the current line with the line below the current line. If K_2dcomb 620 is greater than 0.5, more weight is given to the previous line than the next line. Similarly, if K_2dcomb 620 is less than 0.5, more weight is given to the next line than the previous line. Each of the mixing coefficients described below similarly provide a weighting to data from a previous and next line or from a previous and next frame.

Figure 15A:
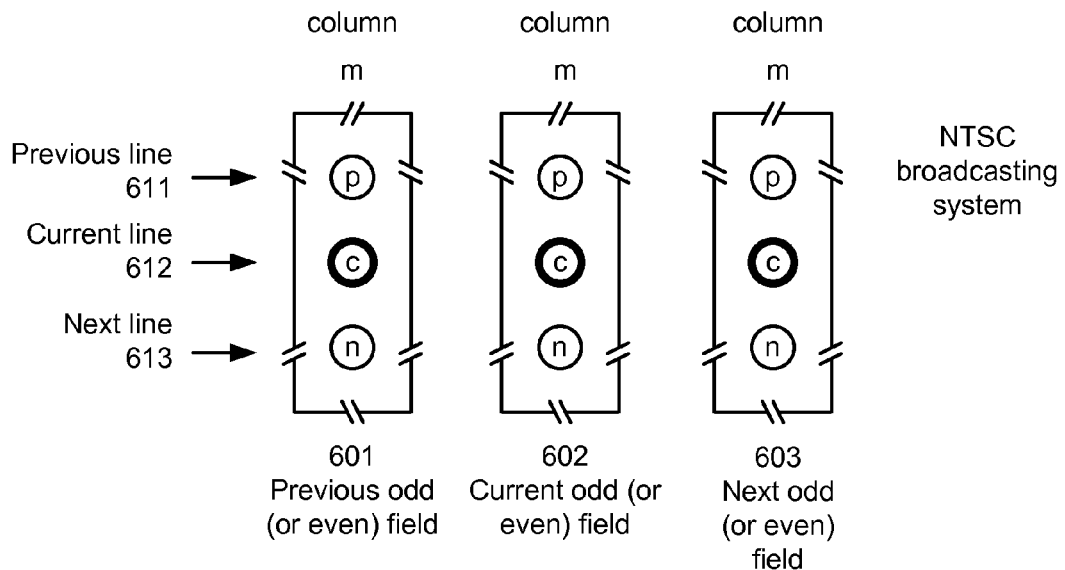
FIGS. 15A and 15B show lines and columns from multiple frames, in accordance with the present invention.
Figure 15B:
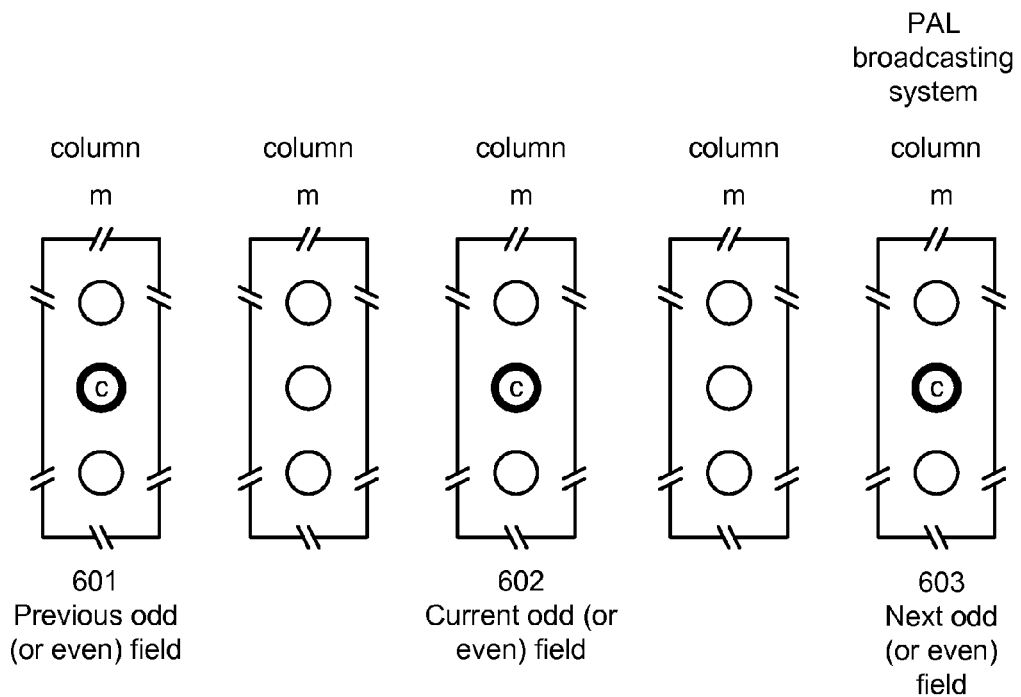

FIGS. 15A and 15B show lines and columns from multiple frames, in accordance with the present invention. FIG. 15A shows three arrays of pixel positions associated with a previous field 601, a current field 602 and a next field 603 from a CVBS signal within an NTSC broadcasting system. The first array of pixel positions includes pixels in a column m of a previous field 601, including a previous pixel p from a previous line, a current pixel c from a current line and a next pixel n from a next line. Similarly, a second array of pixel positions includes pixels in a column m of a current field 602, including a previous pixel p from a previous line, a current pixel c from a current line and a next pixel n from a next line. The third array of pixel positions includes pixels in a column m of a next field 603, including a previous pixel p from a previous line, a current pixel c from a current line and a next pixel n from a next line. When a current field 602 is an odd field, then the previous field 601 and the next field 603 are also odd fields. When a current field 602 is an even field, then the previous field 601 and the next field 603 are also even fields. FIG. 15B shows that a CVBS signal within a PAL broadcasting system have frames of interest separated by an intermediate field.

Figure 16:
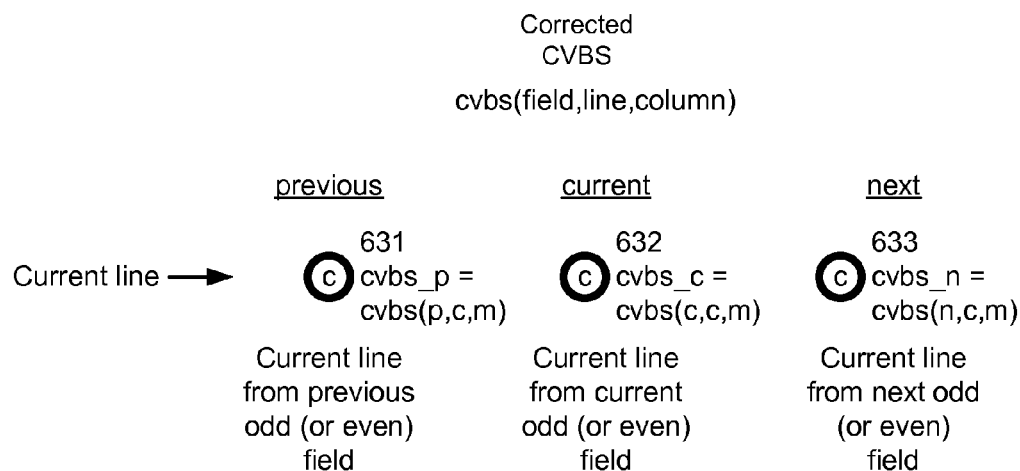
FIG. 16 relates pixels to variables, in accordance with the present invention.

FIG. 16 relates pixels to variables, in accordance with the present invention. Variable cvbs_p 631 represents corrected CVBS data associated with the previous field 601, the current line 612 and the current column m. Variable cvbs_c 632 represents corrected CVBS data associated with the current field 602, the current line 612 and the current column m. Variable cvbs_n 633 represents corrected CVBS data associated with the next field 603, the current line 612 and the current column m. These CVBS data are used for computing temporal mixing coefficients, luminance and chrominance values as described in further detail below.

Figure 17:
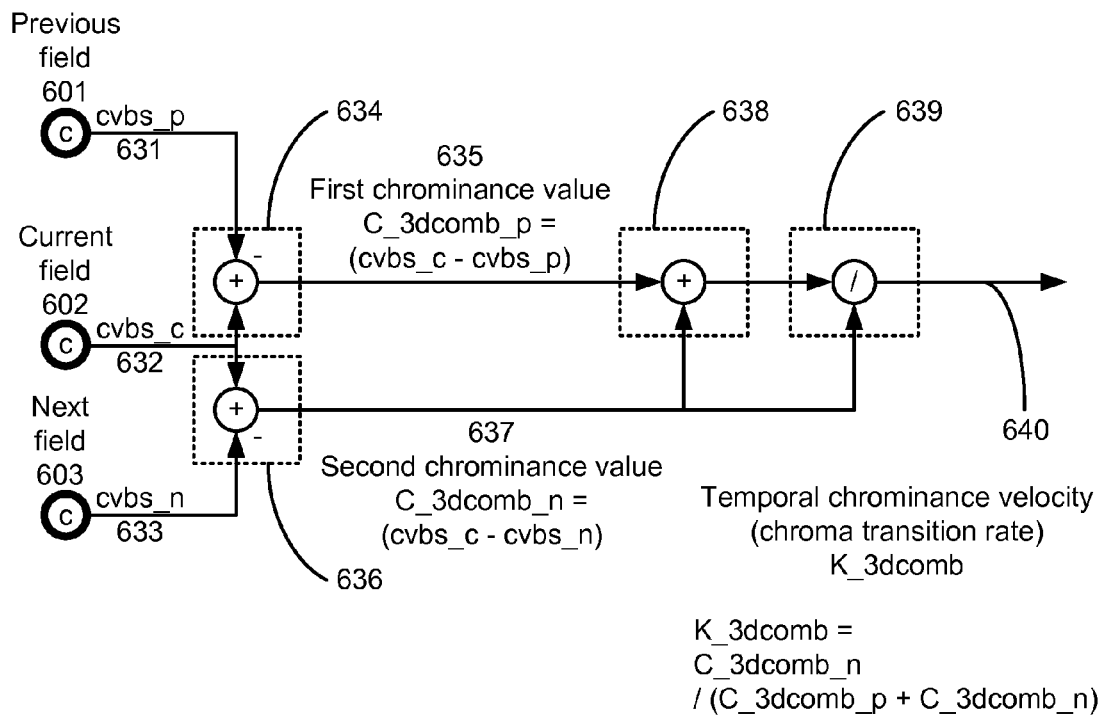
FIG. 17 shows circuitry for generating a temporal chrominance velocity, in accordance with the present invention.

FIG. 17 shows circuitry for generating a temporal chrominance velocity 640, in accordance with the present invention. The temporal chrominance velocity 640 is a function of data (cvbs_p 631, cvbs_c 632 and cvbs_n 633) from the three pixel positions described above with reference to FIG. 16. Respective differences are computed by units 634 and 636. Specifically, a first difference C_3dcomb_p is computed by summer 634 as C_3dcomb_p=cvbs_p−cvbs_c. A second difference C_3dcomb_n is computed by summer 636 as C_3dcomb_n=cvbs_c−cvbs_n. These differences are summed at 638 then a ratio between the second difference and the summed results are taken at 639 resulting in the temporal chrominance velocity 640, which may be written as:

$$K\_3dcomb = \frac{C\_3dcomb\_n}{C\_3dcomb\_p + C\_3dcomb\_n}.$$

In other embodiments, the temporal chrominance velocity 640 may be similarly written as:

$$K\_3dcomb = \frac{C\_3dcomb\_p}{C\_3dcomb\_p + C\_3dcomb\_n}.$$

The temporal chrominance velocity 640 may be used to mix computed luminance values as described below if additional detail.

Figure 18:
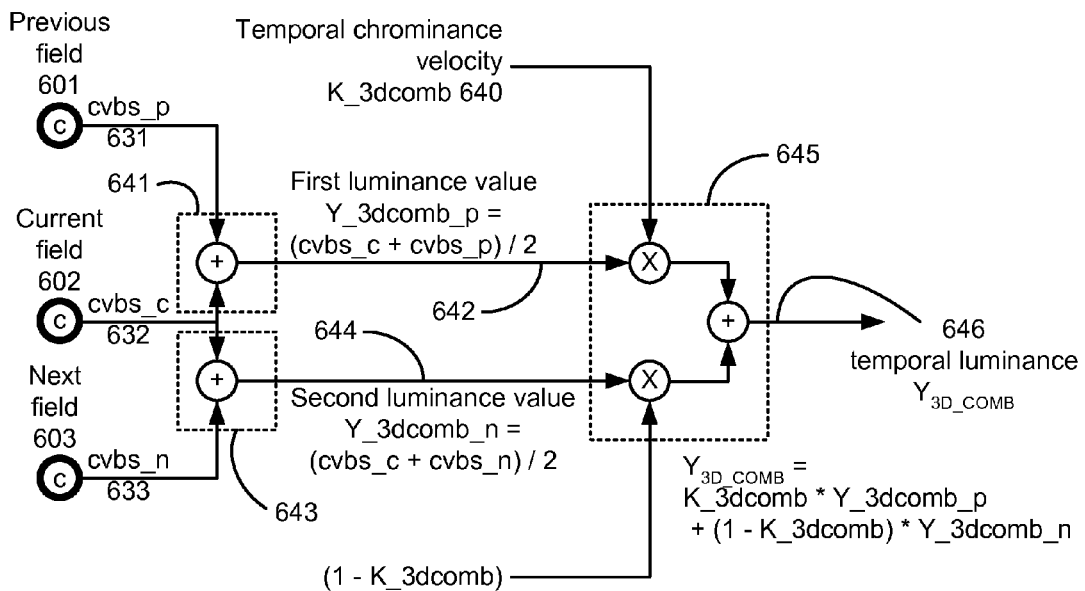
FIG. 18 shows circuitry for generating temporal luminance, in accordance with the present invention.

FIG. 18 shows circuitry for generating a temporal luminance value ($Y_{3D\_COMB}$ 646), in accordance with the present invention. The temporal luminance $Y_{3D\_COMB}$ 646 is determined based on cvbs_p 631, cvbs_c 632 and cvbs_n 633. A first luminance value is computed using summer 641 as:

$$Y\_3dcomb\_p = \frac{cvbs\_c + cvbs\_p}{2}.$$

A second luminance value is computed using summer 643 as:

$$Y\_3dcomb\_n = \frac{cvbs\_c + cvbs\_n}{2}.$$

A mixer 645 scales the first and second luminance values based on the temporal chrominance velocity (K_3dcomb 640) and then sums the scaled values. The resulting temporal luminance value ($Y_{3D\_COMB}$ 646) may be written as $Y_{3D\_COMB}$=K_3dcomb*Y_3dcomb_p+(1−K_3dcomb)*Y_3dcomb_n.

In some embodiments, an overall luminance ($Y_{MIX}$) is based on mixing and/or selecting among a spatial luminance ($Y_{2D\_COMB}$), a temporal luminance ($Y_{3D\_COMB}$), and a notch luminance ($Y_{NOTCH}$). In a first embodiment, these three luminance values may be scaled and summed. Alternatively, a pair of these three luminance values may be scaled and summed. Next, a selection may be made between the resulting scaled and summed luminance values and the third luminance value. For example, the spatial luminance ($Y_{2D\_COMB}$) and temporal luminance ($Y_{2D\_COMB}$) may be mixed first as described below with reference to FIG. 19. Next, a selection may be made between this resulting luminance ($Y_{COMB}$) and the notch filtered luminance ($Y_{NOTCH}$).

In an alternative embodiment, the notch luminance ($Y_{NOTCH}$) and spatial luminance ($Y_{2D\_COMB}$) are each scaled and the scaled valued summed to produce an intermediate spatial luminance ($Y_{2D}$). Next, a selection is made between the intermediate spatial luminance ($Y_{2D}$) and the temporal luminance ($Y_{3D\_COMB}$). Alternatively to a selection between the intermediate spatial luminance ($Y_{2D}$) and the temporal luminance ($Y_{3D\_COMB}$), a weighting between these values may be used. For example, if a pixel is determined to contain relatively still data as compared to a first threshold, then the temporal luminance ($Y_{3D\_COMB}$) may be selected. If the pixel is determined to contain relatively moving data relative to a second threshold, then the intermediate spatial luminance ($Y_{2D}$) may be selected. If the pixel is determined to be somewhere in between still and moving (in between the first and second thresholds), then the temporal luminance ($Y_{3D\_COMB}$) and the intermediate spatial luminance ($Y_{2D}$) may be averaged to generate the overall luminance ($Y_{MIX}$).

Figure 19A:
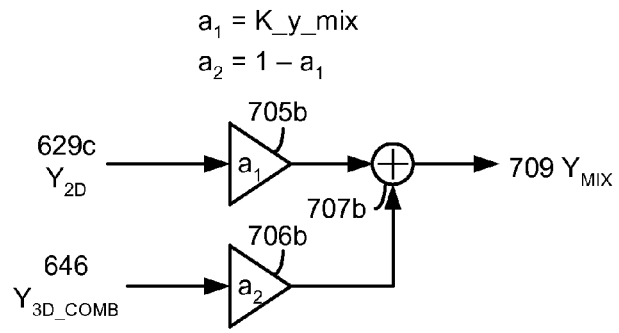
FIGS. 19A and 19B show circuitry for mixing spatial and temporal luminance values, in accordance with the present invention.
Figure 19B:
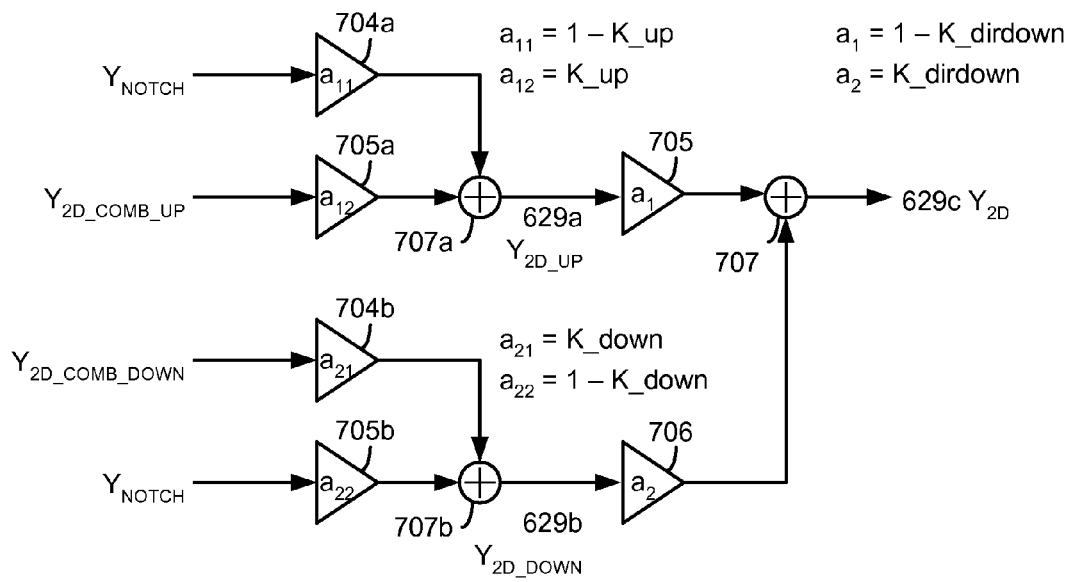

FIGS. 19A and 19B show circuitry for mixing luminance values, in accordance with the present invention. FIG. 19A shows circuitry for mixing an intermediate spatial luminance value ($Y_{2D}$), described further below, with a temporal luminance value ($Y_{3D\_COMB}$). First, the spatial luminance value ($Y_{2D}$) is scaled by a scaler 705b with a first coefficent ($a_1$=K_y_mix). Next, the temporal luminance value ($Y_{3D\_COMB}$) is scaled 706b by a second coefficent ($a_2$=1−$a_1$). The results are summed with summer 707b to produce an overall mixed luminance value ($Y_{MIX}$).

FIG. 19B shows circuitry for mixing spatial luminance values ($Y_{NOTCH}$, $Y_{2D\_COMB\_UP}$ and $Y_{2D\_COMB\_DOWN}$) to produce an intermediate spatial luminance value ($Y_{2D}$ 709). The notched filtered luminance value ($Y_{NOTCH}$) and the spatial luminance value ($Y_{2D\_COMB\_UP}$) are scaled by scalers 704a and 705a with coefficients ($a_{11}$=1−K_up and $a_{12}$=K_up, respectively), then summed with summer 707a to produce a first intermediate spatial luminance value ($Y_{2D\_UP}$ 629a). Similarly, the notched filtered luminance value ($Y_{NOTCH}$) and the spatial luminance value ($Y_{2D\_COMB\_DOWN}$) are scaled by scalers 704b and 705b with coefficients ($a_{21}$=K_down and $a_{22}$=1−K_down, respectively), then summed with summer 707b to produce a second intermediate spatial luminance value ($Y_{2D\_DOWN}$ 629b). The first intermediate spatial luminance value ($Y_{2D\_UP}$ 629a) and the second intermediate spatial luminance value ($Y_{2D\_DOWN}$ 629b) are scaled by scalers 705 and 706 using coefficients (1−K_dirdown and K_dirdown, respectively), then summed with summer 707 to produce an intermediate spatial luminance value ($Y_{2D}$).

Figure 20A:
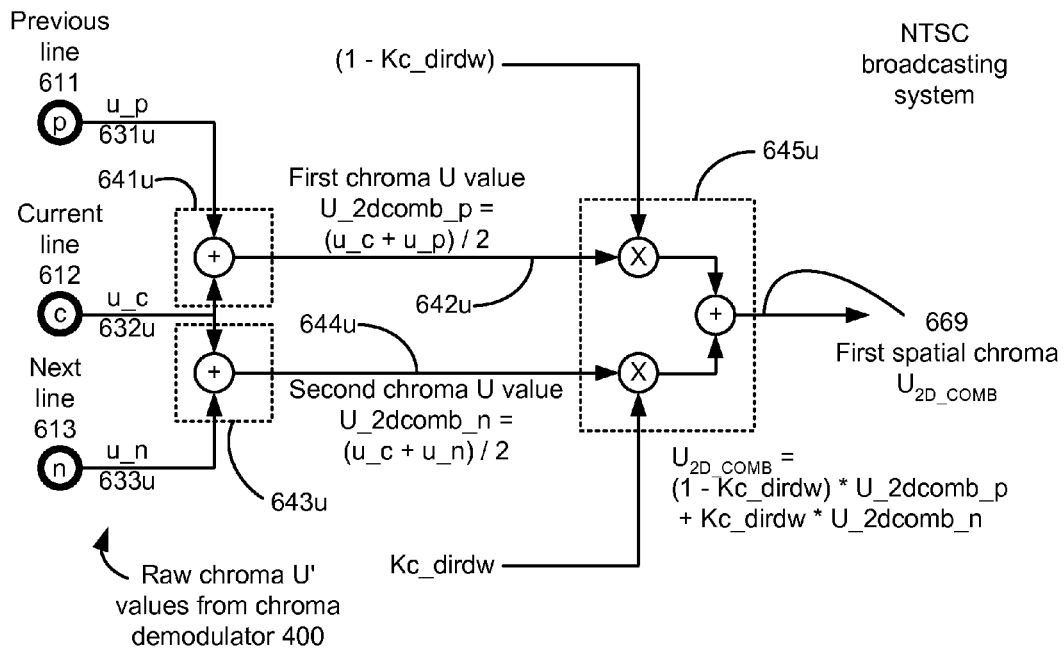
FIGS. 20A, 20B, 21A, 21B, 22 and 23 show circuitry for computing spatial and temporal chrominance values, in accordance with the present invention.
Figure 20B:
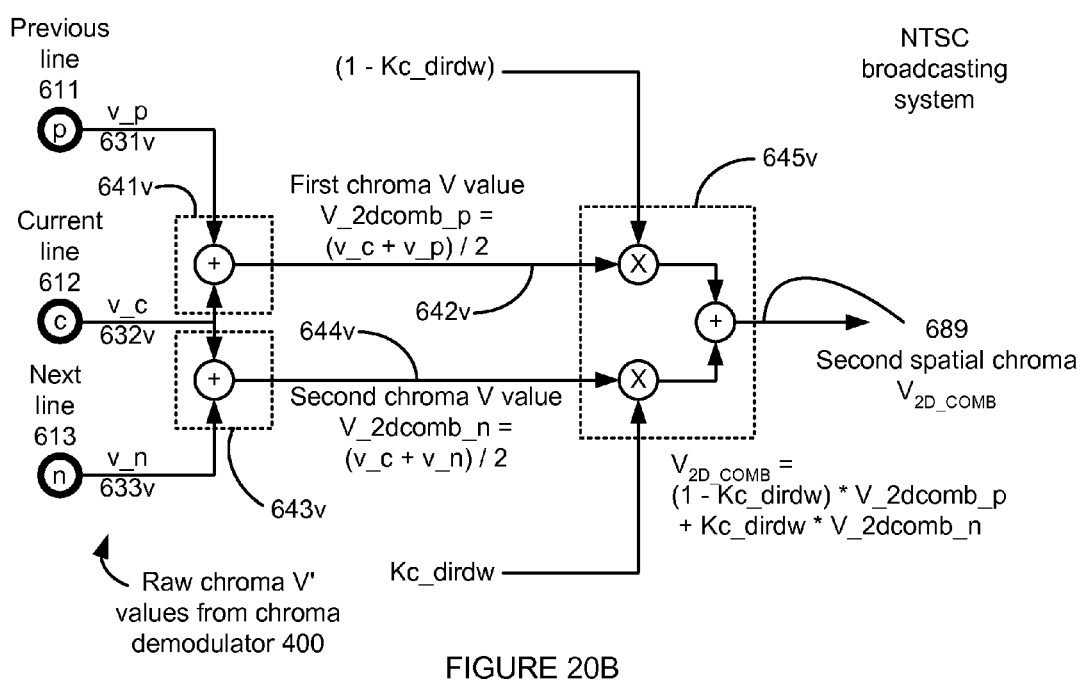
Figure 21A:
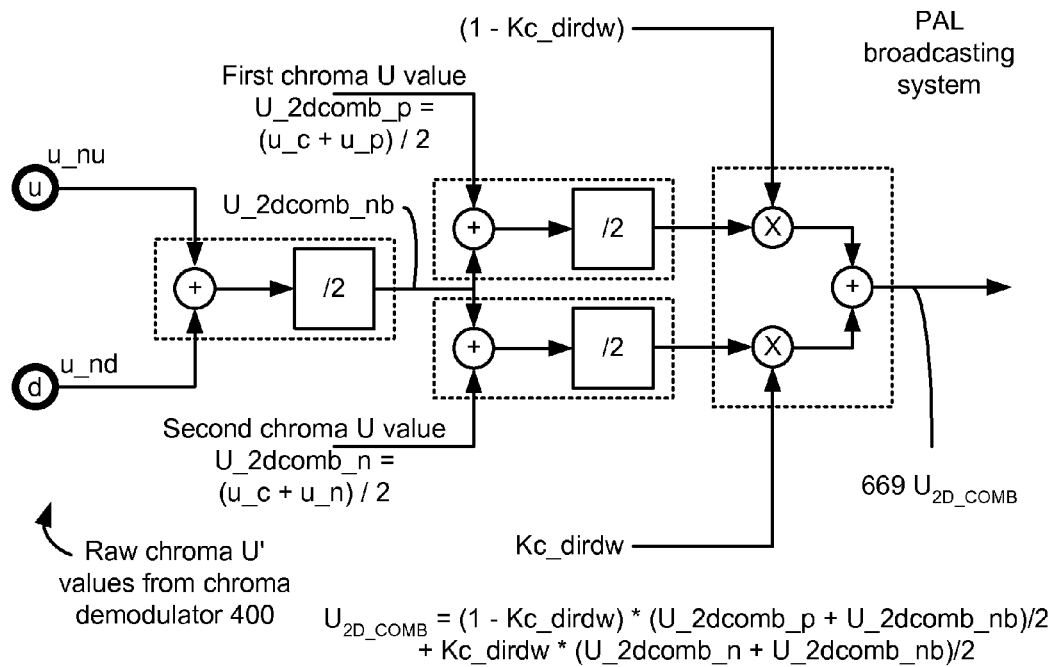
Figure 21B:
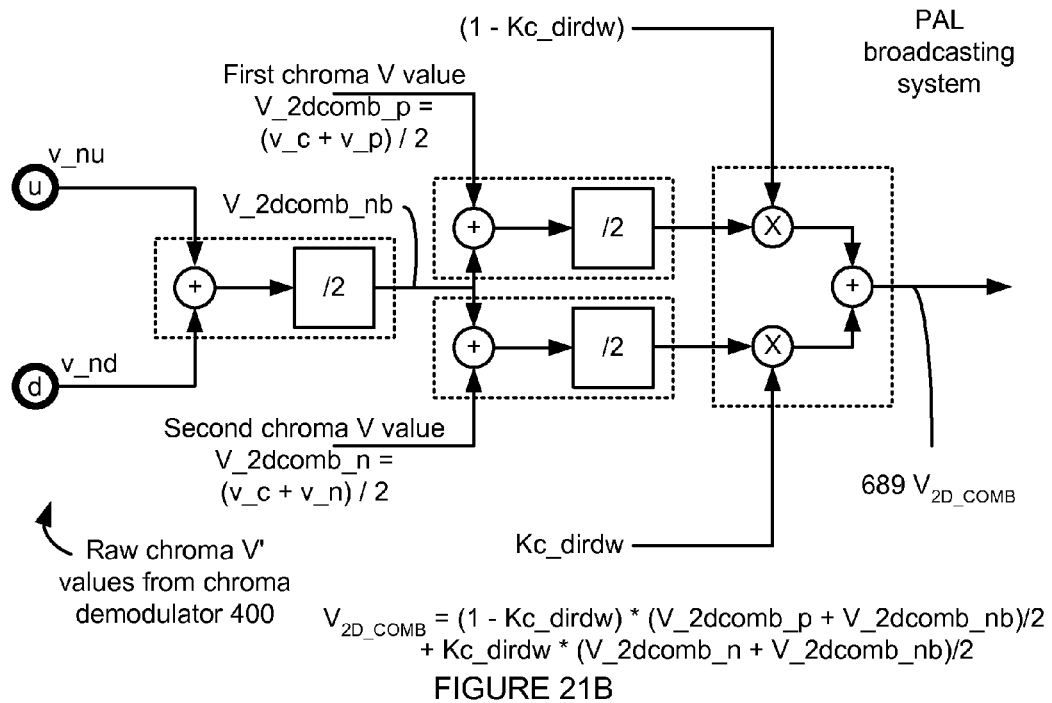
Figure 22:
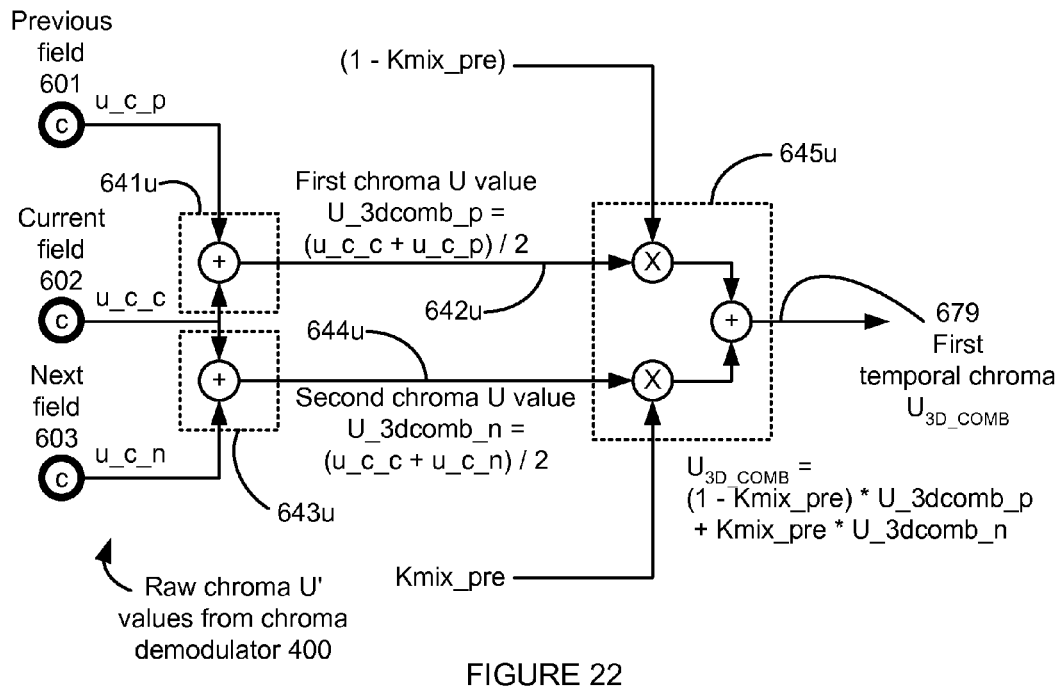
Figure 23:
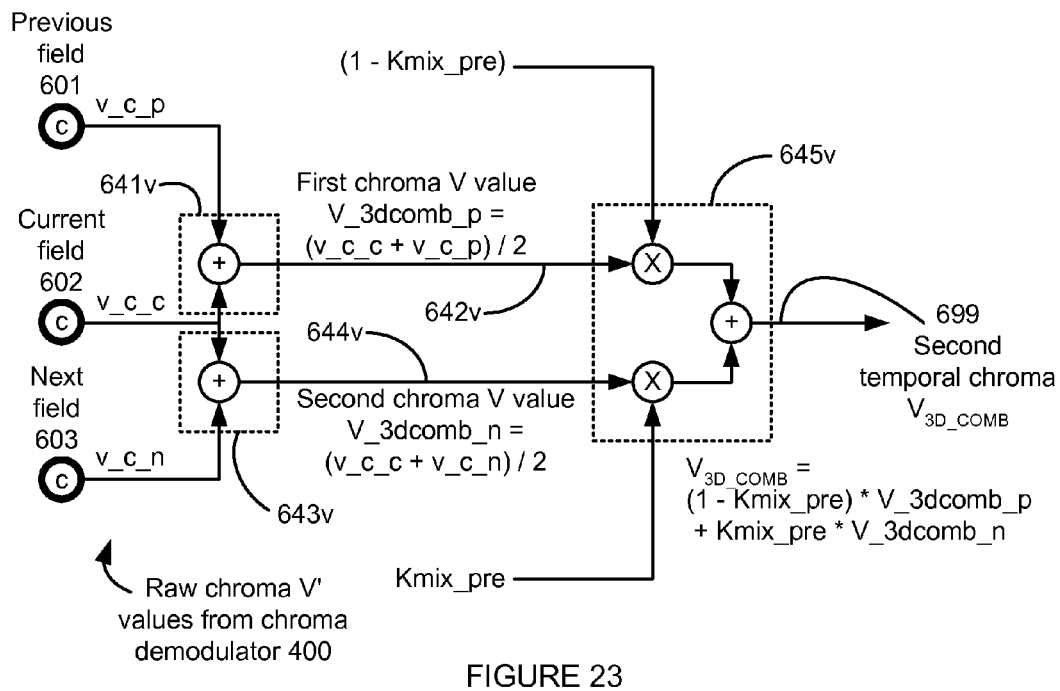

FIGS. 20A, 20B, 21, 22A, 22B and 23 show circuitry for computing spatial and temporal chrominance values, in accordance with the present invention. FIGS. 20A and 20B show example circuitry to compute spatial chrominance for a NTSC broadcasting system. FIGS. 21A and 21B show example circuitry to compute spatial chrominance for a PAL broadcasting system. FIGS. 22 and 23 show example circuitry to compute temporal chrominance.

In FIG. 20A, circuitry computes a first spatial chrominance value ($U_{2D\_COMB}$) based on raw chroma values U' (u_p 631u, u_c 632u & u_n 633u) of a current field 602 from chroma demodulator 400 for the NTSC broadcasting system. A first raw chroma value u_p 631u is data generated at a center pixel c in a previous line 611. A second raw chroma value u_c 632u is data generated at a center pixel c in a current line 612. A third raw chroma value u_p 633u is data generated at a center pixel c in a next line 613. Values from the previous, current and next lines may be buffered in memory. These chroma values are first averaged by summers 641u and 643u and then mixed by mixer 645u to produce the first spatial chrominance value ($U_{2D\_COMB}$). These computations may be implemented in various equivalent fashions with or without intermediate values. For example, the first spatial chrominance value may be written as:

$$U_{2D\_COMB}=(1-Kc\_dirdw)*U\_2\mathrm{dcomb}\_p+Kc\_dirdw*U\_2\mathrm{dcomb}\_n,$$

where a first chroma U value is the intermediate value:

$$U\_2\mathrm{dcomb}\_p=(u\_c+u\_p)/2,$$

where a second chroma U value is the intermediate value:

$$U\_2\mathrm{dcomb}\_n=(u\_c+u\_n)/2.$$

Similarly in FIG. 20B, circuitry computes a second spatial chrominance value ($V_{2D\_COMB}$) based on raw chroma values V' (v_p 631v, v_c 632v & v_n 633v) of a current field 602 from chroma demodulator 400. A first raw chroma value v_p 631v is data generated at the center pixel c in the previous line 611. A second raw chroma value v_c 632v is data generated at the center pixel c in the current line 612. A third raw chroma value v_p 633v is data generated at the center pixel c in the next line 613. These chroma values are first averaged by summers 641v and 643v and then mixed by mixer 645v to produce the second spatial chrominance value ($V_{2D\_COMB}$). In one example, the first spatial chrominance value may be written as:

$$V_{2D\_COMB}=(1-Kc\_dirdw)*V\_2\mathrm{dcomb}\_p+Kc\_dirdw*V\_2\mathrm{dcomb}\_n,$$

where a first chroma V value is the intermediate value:

$$V\_2\mathrm{dcomb}\_p=(v\_c+v\_p)/2,$$

where a second chroma V value is the intermediate value:

$$V\_2\mathrm{dcomb}\_n=(v\_c+v\_n)/2.$$

FIGS. 20A and 20B show different functional blocks (e.g., summers 641u & 641v or mixers 645u & 645v) performing the identical functions except with different input signals. These functions may be performed by different hardware or software (as shown) or the functions may be performed sequentially by the same hardware.

In FIG. 21A, circuitry computes a first spatial chrominance value $U_{2D\_COMB}$ 669 based on raw chroma values U' (including u_nu, u_nd, u_p, u_c & u_n) of a current field 602 from chroma demodulator 400 for the PAL broadcasting system. Note that in a PAL broadcasting system, neighboring pixel may be used to further refine the first spatial chrominance value. Value u_nu represents a raw chroma value from neighboring pixel u ("up") as described in FIG. 12B. Value u_nd represents a raw chroma value from neighboring pixel d ("down"). Values u_p, u_c and u_n are the same as those above with reference to FIG. 20A. The first spatial chrominance value for the PAL system may be similarly written as:

$$U_{2D\_COMB}=(1-Kc\_dirdw)*(U\_2\mathrm{dcomb}\_p+U\_2\mathrm{dcomb}\_nb)/2+Kc\_dirdw*(U\_2\mathrm{dcomb}\_n+U\_2\mathrm{dcomb}\_nb)/2,$$

where $U\_2\mathrm{dcomb}_p=(u_c+u_p)/2$,
where $U\_2\mathrm{dcomb}\_nb=(u\_nu+u\_nd)/2$, and
where $U\_2\mathrm{dcomb}\_n=(u\_c+u\_n)/2$.

In FIG. 21B, circuitry computes a second spatial chrominance value $V_{2D\_COMB}$ 689 based on raw chroma values V' (including v_nu, v_nd, v_p, v_c & v_n) of a current field 602 from chroma demodulator 400 for the PAL broadcasting system. Value v_nu represents a raw chroma value from neighboring pixel u ("up") as described in FIG. 12B. Value v_nd represents a raw chroma value from neighboring pixel d ("down"). Values v_p, v_c and v_n are the same as those above with reference to FIG. 20B. The second spatial chrominance value for the PAL system may be written as:

$$V_{2D\_COMB}=(1-Kc\_dirdw)*(V\_2\mathrm{dcomb}\_p+V\_2\mathrm{dcomb}\_nb)/2+Kc\_dirdw*(V\_2\mathrm{dcomb}\_n+V\_2\mathrm{dcomb}\_nb)/2,$$

where $V\_2\mathrm{dcomb}_p=(v_c+v_p)/2$,
where $V\_2\mathrm{dcomb}\_nb=(v\_nu+v\_nd)/2$, and
where $V\_2\mathrm{dcomb}\_n=(v\_c+v\_n)/2$.

FIGS. 22 and 23 are shown to compute temporal chrominance values by reusing the circuitry of FIGS. 20A and 20B. Alternatively, the summers and mixers may be separate and dedicated to the functions of computing the temporal chrominance values. In FIG. 22, circuitry computes a first temporal chrominance value based on a current raw chroma values U' (u_c_p, u_c_c & u_c_n) where u_c_p is a value from a current line and a previous field 601, where u_c_c is a value from a current line and a current field 602 and where u_c_n is a value from a current line and a next field 603. The first temporal chrominance value may be written as:

$$U_{3D\_COMB} = U\_3dcomb\_p * Kmix\_pre + U\_3dcomb\_n * (1 - Kmix\_pre)$$

where a first temporal chroma U value (a previous value p) is an intermediate value:

$$U\_3dcomb\_p = (u\_c\_c + u\_c\_p)/2,$$

where a second temporal chroma U value (a next value n) is an intermediate value:

$$U\_3dcomb\_n = (u\_c\_c + u\_c\_n)/2.$$

In FIG. 23, circuitry computes a second temporal chrominance value based on a current raw chroma values V' (v_c_p, v_c_c & v_c_n) where v_c_p is a value from a current line and a previous field 601, where v_c_c is a value from a current line and a current field 602 and where v_c_n is a value from a current line and a next field 603. The second temporal chrominance value may be written as:

$$V_{3D\_COMB} = V\_3dcomb\_p * Kmix\_pre + V\_3dcomb\_n * (1 - Kmix\_pre)$$

where a first temporal chroma V value (a previous value p) is an intermediate value:

$$V\_3dcomb\_p = (v\_c\_c + v\_c\_p)/2,$$

where a second temporal chroma V value (a next value n) is an intermediate value:

$$V\_3dcomb\_n = (v\_c\_c + v\_c\_n)/2.$$

Figure 24:
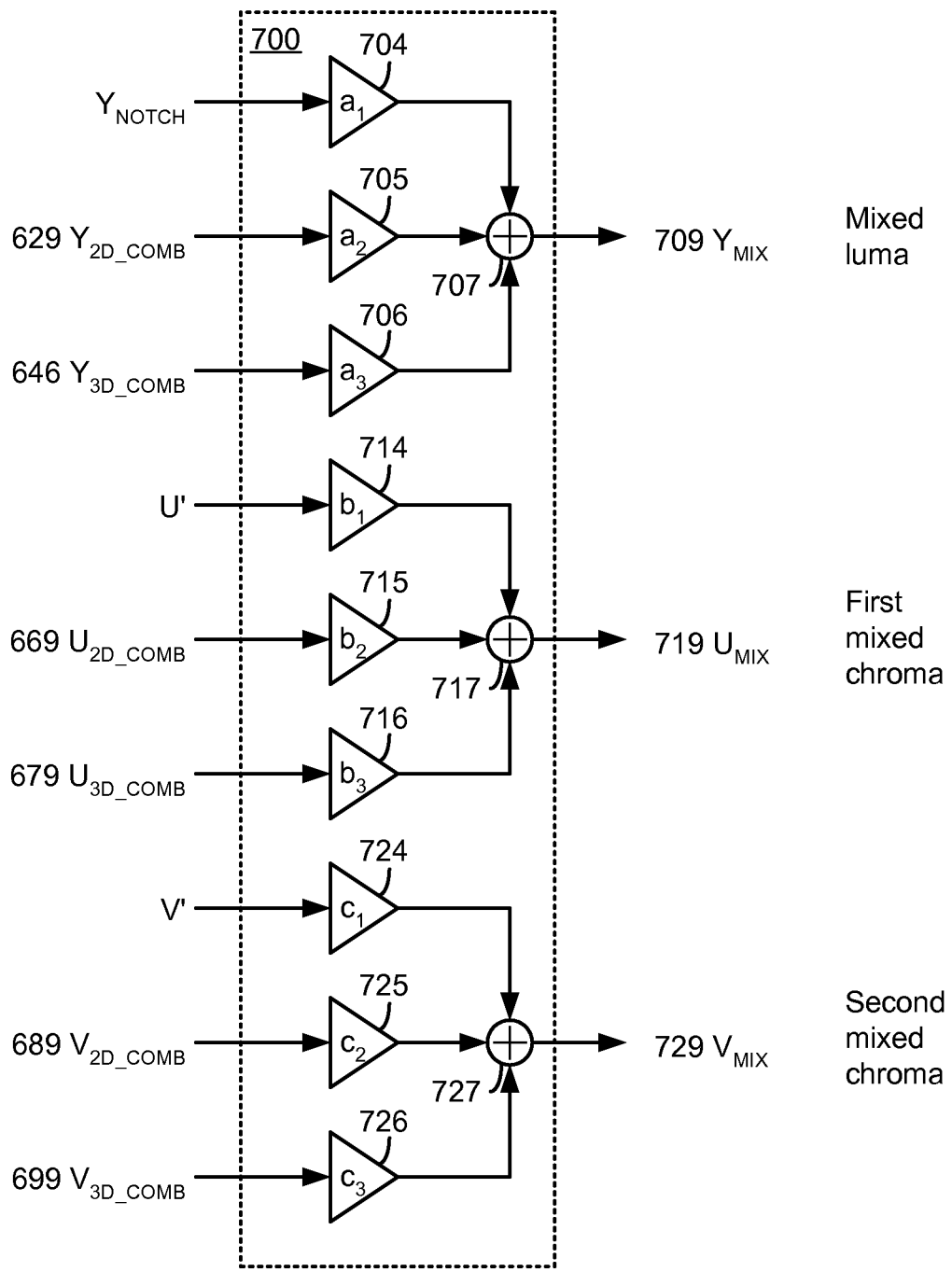
FIGS. 24 and 25 show circuitry for mixing spatial and temporal luminance and chrominance values, in accordance with the present invention.
Figure 25:
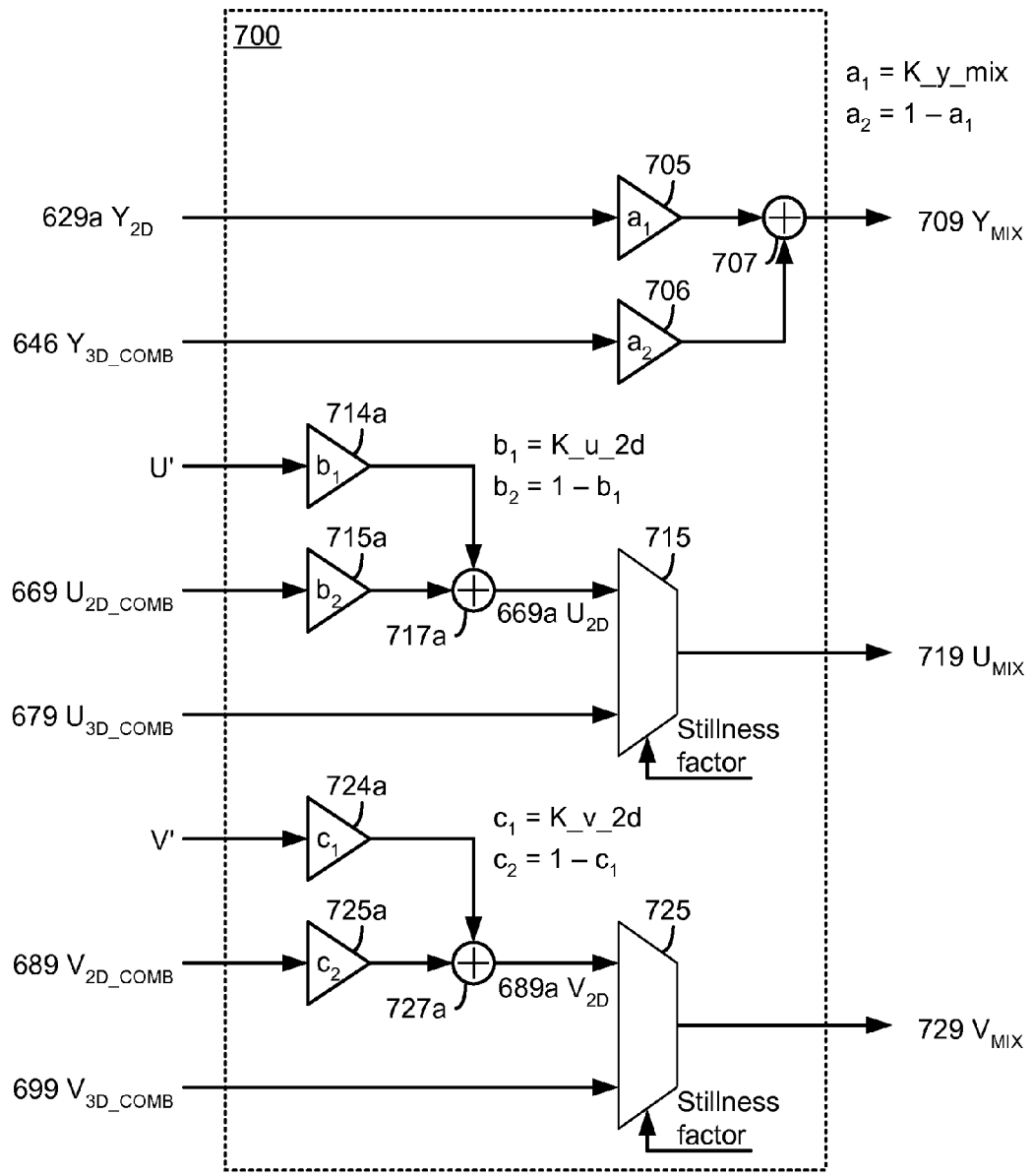

FIGS. 24 and 25 show circuitry for mixing spatial and temporal luminance and chrominance values, in accordance with the present invention.

In FIG. 24, circuitry computes a final mixed luminance ($Y_{MIX}$ 709), a first mixed chrominance ($U_{MIX}$ 719), a second mixed chrominance ($U_{MIX}$ 729). The mixed luminance ($Y_{MIX}$ 709) is a function of three input signals: a notched filtered luminance ($Y_{NOTCH}$), a luminance ($Y_{2D\_COMB}$ 729) and a temporal luminance ($Y_{3D\_COMB}$ 749). The input signals are weighted by respective amplifiers 704, 705 and 706 by values $a_1$, $a_2$ and $a_3$, which may typically be values ranging from zero to one. In some embodiments, the sum of $a_1$, $a_2$ and $a_3$ is unity. The first mixed chrominance ($U_{MIX}$ 719) is a function of three input signals: a corrected chrominance (U'), a first spatial chrominance ($U_{2D\_COMB}$ 669) and a first temporal chrominance ($U_{3D\_COMB}$ 679). The input signals are weighted by respective amplifiers 714, 715 and 716 by values $b_1$ (K_u_2d), $b_2$ ($1-b_1=1-$K_u_2d) and $b_3$, which may typically be values ranging from zero to one, and in some embodiments sum to unity. The second mixed chrominance ($V_{MIX}$ 729) is a function of three input signals: a corrected chrominance (V'), a second spatial chrominance ($V_{2D\_COMB}$ 689) and a second temporal chrominance ($V_{3D\_COMB}$ 699). The input signals are weighted by respective amplifiers 724, 725 and 726 by values $c_1$ (K_v_2d), $c_2$ ($1-c_1=1-$K_v_2d) and $c_3$, which may typically be values ranging from zero to one, and in some embodiments sum to unity.

FIG. 25 shows an alternative embodiment for circuitry 700 that computes a mixed luminance ($Y_{MIX}$ 709), a first mixed chrominance ($U_{MIX}$ 719), a second mixed chrominance ($U_{MIX}$ 729) based on spatial and temporal luminance and chrominance values.

The mixed luminance ($Y_{MIX}$ 709) is shown as a function of two input signals. The first of the two input signals is a spatial luminance ($Y_{2D}$ 729a), which is itself a function of a notched filtered luminance ($Y_{NOTCH}$) and a luminance ($Y_{2D\_COMB}$ 729) as shown previously. The second of two input signals is a temporal luminance ($Y_{3D\_COMB}$ 749). The input signals are weighted by amplifiers 705 and 706 with values $a_1$ and $a_2$, respectively, which may typically be values ranging from zero to one. The weighted signals are summed by summer 707 to produce the mixed luminance ($Y_{MIX}$ 709). A mixing coefficient K (e.g., where $K=a_1=1-a_2$ and where K=[0.0 to 1.0]) may be determined to allow a full degree of balancing spatial and temporal luminance values. In some embodiments, the sum of $a_1$ and $a_2$ is unity. For example, during operation if a spatial luminance is favored because temporal variations are too great, $a_1$ may be one and $a_2$ may be zero. Alternatively, if temporal variations are reliable so a temporal luminance is heavily favored, $a_1$ may be zero and $a_2$ may be one. Alternatively, if temporal and spatial variables are expected to be fairly to marginally reliable, an even balance of spatial and temporal may be provided with $a_1=0.5$ and $a_2=0.5$.

The first mixed chrominance ($U_{MIX}$ 719) is shown as a function of three input signals: a first corrected chrominance (U'), a first spatial chrominance ($U_{2D\_COMB}$ 669) and a first temporal chrominance ($U_{3D\_COMB}$ 679). The spatial input signals, U' and $U_{2D\_COMB}$ 669, are weighted by amplifiers 714a and 715a, respectively. The weighted signals are summed by summer 717a to produce a first intermediate spatial chrominance ($U_{2D}$ 669a). The first intermediate spatial chrominance ($U_{2D}$ 669a) along with the first temporal chrominance ($U_{3D\_COMB}$ 679) are inputs to a multiplexer 715 with a stillness factor as a control signal. The Stillness factor is either zero (Stillness=FALSE) if the pixel is considered to be a moving pixel and a one (Stillness=TRUE) if the pixel is considered to be a still pixel. A pixel is still if there is little to no change from field to field for that pixel position and is moving otherwise. Therefore, the multiplexer 715 acts to select the first intermediate spatial chrominance ($U_{2D}$ 669a) if the pixel position is determined to be moving (Stillness=FALSE) and to select the first temporal chrominance ($U_{3D\_COMB}$ 679) if the pixel position is determined to be still (Stillness=TRUE). The multiplexer 715 provided the selected signal as first mixed chrominance ($U_{MIX}$ (719) at its output port.

Similarly, the first mixed chrominance ($V_{MIX}$ 729) is shown as a function of three input signals: a second corrected chrominance (V'), a second spatial chrominance ($V_{2D\_COMB}$ 689) and a second temporal chrominance ($V_{3D\_COMB}$ 699). The spatial input signals, V' and $V_{2D\_COMB}$ 689, are weighted by amplifiers 724a and 725a, respectively. The weighted signals are summed by summer 727a to produce a second intermediate spatial chrominance ($V_{2D}$ 689a). The second intermediate spatial chrominance ($V_{2D}$ 689a) along with the second temporal chrominance ($V_{3D\_COMB}$ 699) are inputs to a multiplexer 725 with the stillness factor, described above, as a control signal. Again, the multiplexer 725 acts to select the second intermediate spatial chrominance ($V_{2D}$ 689a) if the pixel position is determined to be moving and the second temporal chrominance ($V_{3D\_COMB}$ 699) if still. The multiplexer 725 provided the selected signal as second mixed chrominance ($V_{MIX}$ 729) at its output port.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. The description is not intended to be exhaustive or to limit the invention to the precise form disclosed. Furthermore, it should be understood that the invention can be practiced with modification and alteration.

What is claimed is:

1. A method of filtering, using a multi-directional comb filter, pixel data from a sequence of fields of pixel data, wherein the fields of pixel data comprise a previous field, a current field and a next field, and wherein each of said fields includes a previous line, a current line, a next line, the method comprising:
   determining a temporal chrominance velocity (K_3dcomb) relative to a pixel position of the current field, wherein the temporal chrominance velocity (K_3dcomb) is determined as one or more of:
   (1)  C_3dcomb_p/(C_3dcomp_p+C_3dcomb_n), wherein C_3dcomb_p=(cvbs_c−cvbs_p), wherein cvbs_c comprises a second video signal value for the pixel position on the previous field and wherein cvbs_p comprises a first video signal value for the pixel position on the current field; and
   (2)  C_3dcomb_n/(C_3dcomp_p+C_3dcomb_n), wherein C_3dcomb_n=(cvbs_c−cvbs_n), wherein cvbs_n comprise a third video signal value for the pixel position on the next field; and
   determining a temporal luminance based on:
   (1) the first video signal value;
   (2) the second video signal value;
   (3) the third video signal value; and
   (4) the temporal chrominance velocity.

2. The method of claim 1, further comprising scaling the temporal luminance based on the temporal chrominance velocity.

3. The method of claim 1, wherein the temporal luminance ($Y_{3D\_COMB}$) is:

$$K\_3dcomb*Y\_3dcomb\_p+(1-K\_3dcomb)*Y\_3dcomb\_n;$$

wherein Y_3dcomb_p=(cvbs_c+cvbs_p)/2; and
wherein Y_3dcomb_n=(cvbs_c+cvbs_n)/2.

4. The method of filtering of claim 1, wherein determining of the temporal luminance comprises scaling:
   a summation of the first video signal value and second video signal value; and
   a summation of the second video signal value and the third video signal value.

5. The method of filtering of claim 1, wherein determining of the temporal luminance comprises determining an overall temporal luminance by selecting from among a spatial luminance, a temporal luminance, and a mix of the spatial luminance and the temporal luminance.

6. A multi-directional comb filter for filtering pixel data from a sequence of fields of pixel data, wherein the fields of pixel data comprise a previous field, a current field and a next field, and wherein each of said fields includes a previous line, a current line, a next line, the multi-directional comb filter comprising:
   means for determining a temporal chrominance velocity (K_3dcomb) relative to a pixel position of the current field, wherein the temporal chrominance velocity (K_3dcomb) is determined as one or more of:
   (1)  C_3dcomb_p/(C_3dcomp_p+C_3dcomb_n), wherein C_3dcomb_p=(cvbs_c−cvbs_p), wherein cvbs_c comprises a second video signal value for the pixel position on the previous field and wherein cvbs_p comprises a first video signal value for the pixel position on the current field; and
   (2)  C_3dcomb_n/(C_3dcomp_p+C_3dcomb_n), wherein C_3dcomb_n=(cvbs_c−cvbs_n), wherein cvbs_n comprise a third video signal value for the pixel position on the next field; and
   means for determining a temporal luminance based on:
   (1) the first video signal value;
   (2) the second video signal value;
   (3) the third video signal value; and
   (4) the temporal chrominance velocity.

7. The multi-directional comb filter of claim 6, wherein the means for determining the temporal luminance comprises means for scaling:
   a summation of the first video signal value and second video signal value; and
   a summation of the second video signal value and the third video signal value.

8. The multi-directional comb filter of claim 6, wherein the temporal luminance ($Y_{3D\_COMB}$) is:

$$K\_3dcomb*Y\_3dcomb\_p+(1-K\_3dcomb)*Y\_3dcomb\_n;$$

wherein Y_3dcomb_p=(cvbs_c+cvbs_p)/2; and
wherein Y_3dcomb_n=(cvbs_c+cvbs_n)/2.

9. The multi-directional comb filter of claim 6, wherein the means for determining the temporal luminance comprises a means for scaling a summation of the first video signal value and second video signal value, and a summation of the second video signal value and the third video signal value.

10. The multi-directional comb filter of claim 6, wherein the means for determining the temporal luminance comprises a means for selecting from among a spatial luminance, a temporal luminance, and a mix of the spatial luminance and the temporal luminance.

* * * * *